US012030164B2

(12) United States Patent
Yoshida

(10) Patent No.: US 12,030,164 B2
(45) Date of Patent: Jul. 9, 2024

(54) PRESSURE REGULATOR AND PNEUMATIC TOOL

(71) Applicant: MAX CO., LTD., Tokyo (JP)

(72) Inventor: Takuma Yoshida, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 17/511,416

(22) Filed: Oct. 26, 2021

(65) Prior Publication Data

US 2022/0126430 A1 Apr. 28, 2022

(30) Foreign Application Priority Data

Oct. 26, 2020 (JP) ................................ 2020-178650
Oct. 26, 2020 (JP) ................................ 2020-178731

(51) Int. Cl.
*B25C 1/04* (2006.01)
*B25C 1/00* (2006.01)

(52) U.S. Cl.
CPC .............. *B25C 1/043* (2013.01); *B25C 1/008* (2013.01)

(58) Field of Classification Search
CPC ........... B25C 1/043; B25C 1/008; B25C 1/04; B25C 1/047; B25C 1/041; B25C 1/47; B25C 1/48
See application file for complete search history.

(56) References Cited

U.S. PATENT DOCUMENTS

2005/0247750 A1 11/2005 Burkholder et al.
2008/0185058 A1* 8/2008 Wakabayashi ............ B25C 1/04 137/613

FOREIGN PATENT DOCUMENTS

JP 2006-263880 A 10/2006
JP 2015-226952 A 12/2015
JP 2016-215353 A 12/2016

OTHER PUBLICATIONS

European Search Report for EP Application No. 21204684.1 dated Mar. 23, 2022. (6 pp.).

* cited by examiner

*Primary Examiner* — Veronica Martin
(74) *Attorney, Agent, or Firm* — Banner & Witcoff, Ltd.

(57) ABSTRACT

A pneumatic tool includes an air chamber; and a pressure adjusting mechanism which adjusts a pressure of a compressed air in the air chamber. The pressure adjusting mechanism includes a valve body which opens and closes a flow path that communicates the air intake and the air chamber; an elastic body which exerts an urging force to the valve body; a support part which supports an end of the elastic body; a pressure receiving member which receives air pressure in the air chamber and presses the elastic body in a direction of closing the flow path; and a load reducing mechanism capable of switching the urging force of the elastic body acting on the valve body between a normal state and a load reduction state in which the urging force smaller than the normal state is exerted.

10 Claims, 15 Drawing Sheets

PRESSURE REGULATOR AND PNEUMATIC TOOL

CROSS-REFERENCE TO RELATED APPLICATION(S)

This application is based on and claims priority under 35 USC 119 from Japanese Patent Application Nos. 2020-178650 filed on Oct. 26, 2020 and 2020-178731 filed on Oct. 26, 2020, the contents of which are incorporated herein by reference.

TECHNICAL FIELD

The present disclosure relates to a pressure regulator and a pneumatic tool provided with the pressure regulator.

BACKGROUND ART

As a pneumatic tool using compressed air as a drive source, for example, a driving machine for driving a fastener such as a nail or a screw that engages with a workpiece such as a plate material, wood, gypsum board or steel plate is known. Compressed air, which is a drive source, is generated by, for example, an air compressor and is supplied to a driving machine via an air hose.

Such a driving machine includes, for example, a piston driven by compressed air, a driver mounted on the piston, and a cylinder accommodating the piston. When compressed air is introduced into an upper chamber of the cylinder in a state where the piston is present near the top dead center, the piston and the driver mounted on the piston can be moved toward the bottom dead center to allow the driver to drive the fastener.

Here, the pressure of the compressed air supplied via the air hose is not always constant. On the other hand, the impact force at the time of driving depends on the pressure of compressed air. Therefore, a pneumatic tool is known in which a valve mechanism for depressurizing to keep the pressure constant is provided. Further, even when the pressure of the compressed air is constant, it may be preferable to change the impact force according to the type of fastener and workpiece. Therefore, a pneumatic tool is known in which a valve mechanism for pressure regulation to adjust the pressure of the compressed air supplied is provided. The driven amount of the fastener can be adjusted by adjusting the pressure.

PTL 1 discloses a driving tool which includes a valve mechanism for adjusting the pressure of compressed air. Specifically, a driving tool is disclosed in which a pressure adjusting mechanism is provided between an accumulator chamber provided in a handle and a compressed air chamber for driving.

PTL 2 also discloses a driving tool which includes a valve mechanism for adjusting the pressure of compressed air. Specifically, a driving tool is disclosed which includes a valve body movable in a first direction to close a main flow path and in a second direction to open the main flow path, a piston connected to the valve body and having a first pressure receiving surface that receives the pressure in the first direction by compressed air and a second pressure receiving surface and a third pressure receiving surface that receive the pressure in the second direction by compressed air, and a spring that constantly urges the piston in the second direction.

CITATION LIST

Patent Literature

[PTL 1] JP2015-226952A
[PTL 2] JP2016-215353A

SUMMARY

However, in such a driving tool, the valve mechanism for depressurizing or pressure regulation (hereinafter, collectively referred to as the "valve mechanism" or the "pressure adjusting mechanism") causes an increase in the size of the driving tool. When trying to arrange the valve mechanism inside the grip of the driving tool in order to suppress the increase in size, a space in a radial direction is limited by the wall surface of the grip, and thus, a space for layout is limited. On the other hand, when the valve mechanism is arranged in the end of the grip as in the driving tools disclosed in PTL 1 and PTL 2, the air plug protrudes greatly from the driving tool, and thus, the full length of the driving tool becomes large. Therefore, an object of the present disclosure is to provide a driving tool capable of shortening its full length.

Further, the spring load of the pressure adjusting mechanism increases according to the set pressure. In a pneumatic tool such as a nailing machine that operates at a relatively high pressure, it may be difficult for a user to operate the pressure adjusting mechanism because the operating load of the pressure adjusting mechanism is large. Therefore, an object of the present disclosure is to provide a pressure regulator capable of reducing the operating load of the pressure adjusting mechanism and a pneumatic tool provided with the pressure regulator.

Further, the pressure of the compressed air supplied to the pneumatic tool may fluctuate due to various factors. In a direct-acting pressure adjusting mechanism, it is known that when a primary pressure, which is a pressure of compressed air on the upstream side of the pressure adjusting mechanism, decreases, a secondary pressure, which is a pressure of compressed air on the downstream side of the pressure adjusting mechanism, increases. Therefore, even when a desired pressure is set by the pressure adjusting mechanism, the secondary pressure may be adjusted to a pressure different from the set pressure, and the driven amount of fastener may vary. Therefore, an object of the present disclosure is to provide a pneumatic tool in which the secondary pressure is not easily affected even when the primary pressure fluctuates.

The present disclosure provides a pneumatic tool including a drive mechanism configured to be driven by compressed air supplied from an air intake. The pneumatic tool includes an air chamber configured to store the compressed air supplied, and a pressure adjusting mechanism configured to adjust the pressure of the compressed air in the air chamber. The pressure adjusting mechanism includes a valve body configured to open and close a flow path that communicates the air intake and the air chamber with each other, an elastic body configured to exert an urging force to the valve body in a direction of opening the flow path, a support part configured to support an end of the elastic body, a pressure receiving member configured to receive air pressure in the air chamber and press the elastic body in a direction of closing the flow path, and a load reducing mechanism capable of switching the urging force of the elastic body acting on the valve body between a normal state and a load reduction state in which the urging force smaller than the normal state is exerted.

Further, the present disclosure is a pressure regulator for adjusting the pressure of compressed air, the pressure regulator includes: a valve body configured to open and close a flow path that communicates an air intake for supplying compressed air and an air outlet for taking out the pressure-adjusted compressed air, an elastic body configured to exert an urging force to the valve body in a direction of opening the flow path, and a pressure receiving member configured to receive air pressure on the downstream side of the valve body and press the elastic body in a direction in which the valve body closes the flow path. The pressure regulator further comprises a load reducing mechanism capable of switching the urging force of the elastic body acting on the valve body between a normal state and a load reduction state in which the urging force smaller than the normal state is exerted.

Further, the present disclosure is a pneumatic tool includes: a drive mechanism configured to be driven by compressed air supplied from an air intake; an air chamber configured to store the compressed air supplied; and a pressure adjusting mechanism configured to adjust the pressure of the compressed air in the air chamber. The pressure adjusting mechanism includes a valve body configured to open and close a flow path that communicates the air intake and the air chamber with each other; an elastic body configured to exert an urging force to the valve body in a direction of opening the flow path; and a pressure receiving member configured to receive air pressure in the air chamber and press the elastic body in a direction of closing the flow path. The pressure receiving member is provided with a second pressure receiving surface that receives air pressure in the air chamber and is pressed in a direction of closing the flow path. The pressure receiving member or the member in contact with the pressure receiving member is provided with a third pressure receiving surface that is formed smaller than the second pressure receiving surface, receives air pressure on an upstream side of the valve body and is pressed in a direction of opening the flow path.

According to the present disclosure, it is possible to provide a driving tool capable of shortening its full length. Alternatively, according to the present disclosure, it is possible to provide a pressure regulator capable of reducing the operating load of the pressure adjusting mechanism and a pneumatic tool provided with the pressure regulator. Alternatively, it is possible to provide a pneumatic tool in which the secondary pressure is not easily affected even when the primary pressure fluctuates.

DESCRIPTION OF EMBODIMENTS

Hereinafter, embodiments of the present disclosure will be described with reference to the drawings. The following embodiments are examples for explaining the present disclosure, and the present disclosure is not intended to be limited only to the embodiments.

Figure 1:
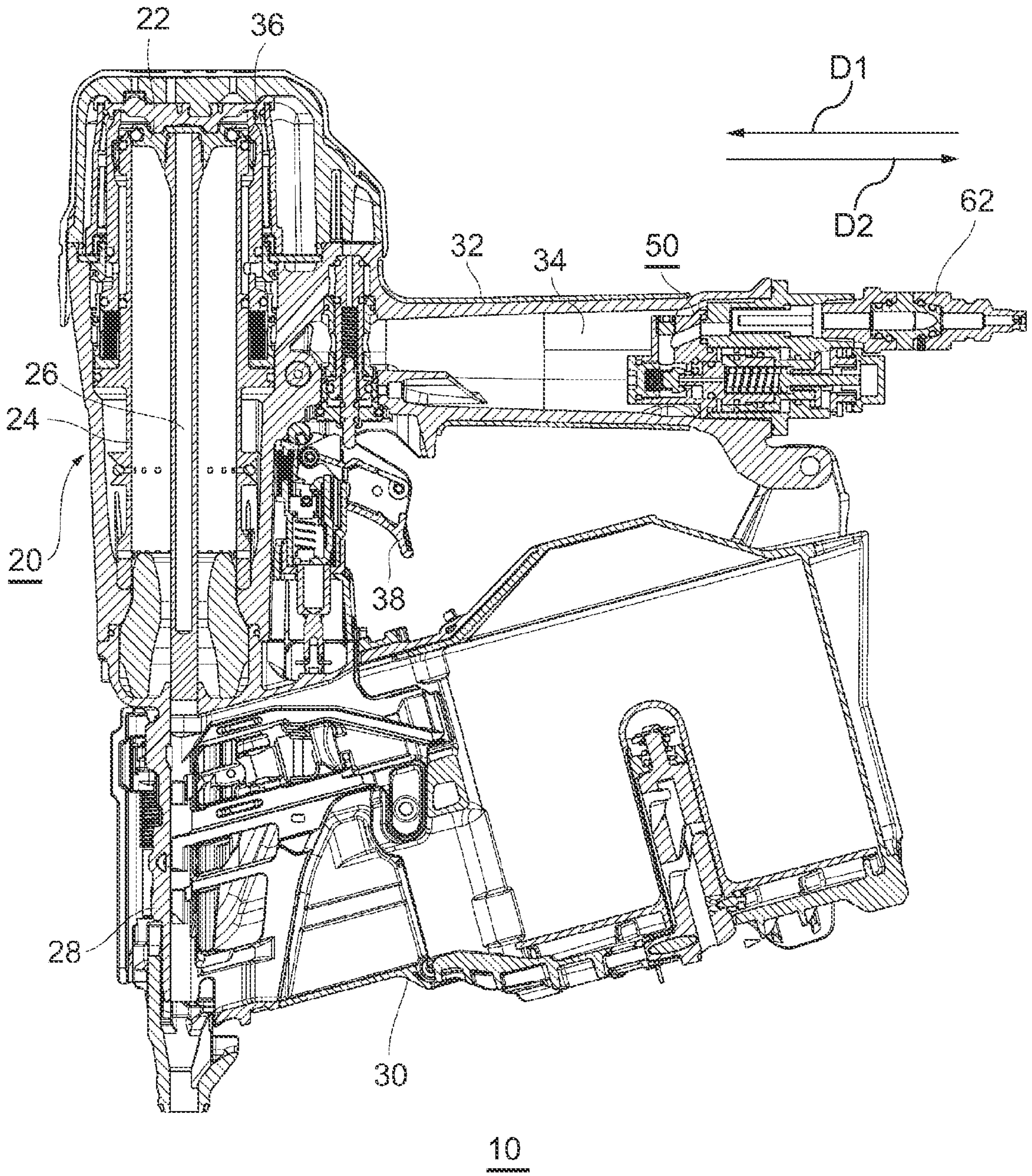
FIG. 1 is a sectional view of a nailing tool according to an embodiment.

Hereinafter, a pneumatic tool according to a first embodiment will be described. FIG. 1 is a sectional view of a nailing tool (an example of "pneumatic tool") according to the first embodiment. For convenience, an upper direction and a lower direction of the paper plane in FIG. 1 may be simply referred to as an upper direction and a lower direction, and a left direction and a right direction of the paper plane in FIG. 1 may be referred to as a first direction D1 and a second direction D2 (direction opposite to the first direction D1), respectively. In the case of a nailing tool 10 shown in FIG. 1, the side facing the second direction D2 is a grip end side of a grip 32, and the side facing the first direction D1 is a main body side.

[Example of Overall Configuration of Pneumatic Tool]

A nailing tool (an example of the "driving tool") is a pneumatic tool for driving a nail (an example of the "fastener") using compressed air as a drive source. The nailing tool 10 includes a drive mechanism 20 driven by compressed air and a regulator 50 (an example of the "pressure adjusting mechanism") for supplying compressed air to the drive mechanism 20.

The drive mechanism 20 includes a driving piston 22 that reciprocates up and down by compressed air, a cylindrical driving cylinder 24 that accommodates the driving piston 22, a driver 26 that is attached to the driving piston 22 and moves integrally with the driving piston 22 to strike a nail, a nose 28 that extends downward to allow the driver 26 to invade and strike a nail, and a magazine 30 that accommodates a nail and supplies the nail to the nose 28.

Further, the nailing tool 10 includes the grip 32 grasped by a user, an air chamber 34 provided in the grip 32, and a main valve (head valve) 36 for controlling the inflow of compressed air stored in the air chamber 34 into the driving cylinder 24. The regulator 50 depressurizes the compressed air supplied from an external air compressor via an air hose (not shown) and supplies it to the air chamber 34.

In such a nailing tool 10, when a user presses a trigger 38, the main valve 36 is opened, and the compressed air in the air chamber 34 flows into an upper chamber in the driving cylinder 24. As a result, the driving piston 22 moves downward, and the driver 26 attached to the driving piston 22 strikes a nail to drive the nail downward.

[Basic Configuration of Pressure Adjusting Mechanism]

Figure 2:
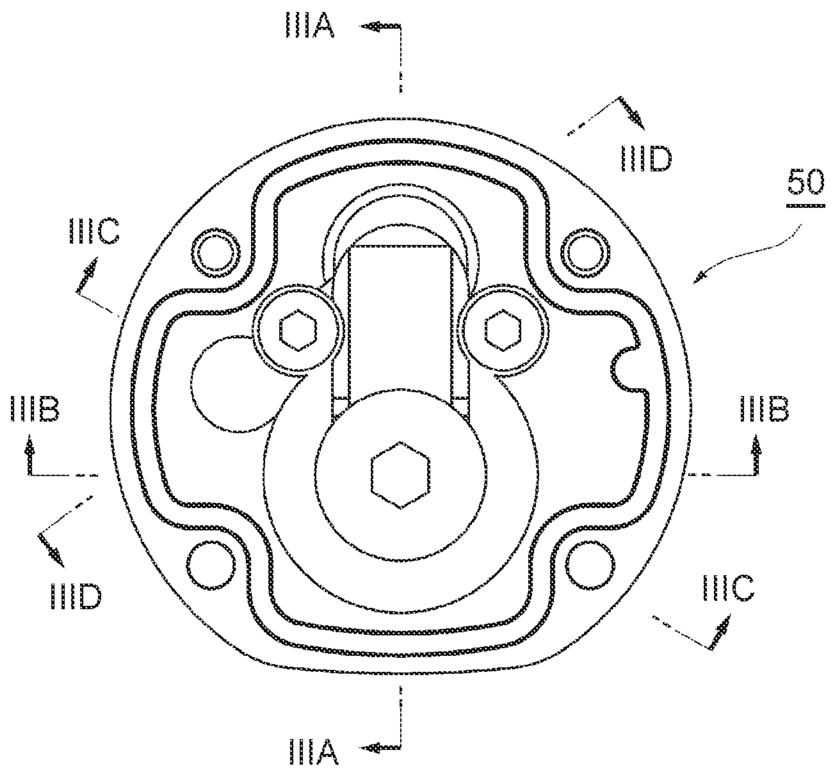
FIG. 2 is a front end view of a regulator before being assembled to the nailing tool according to the embodiment.
Figure 3A:
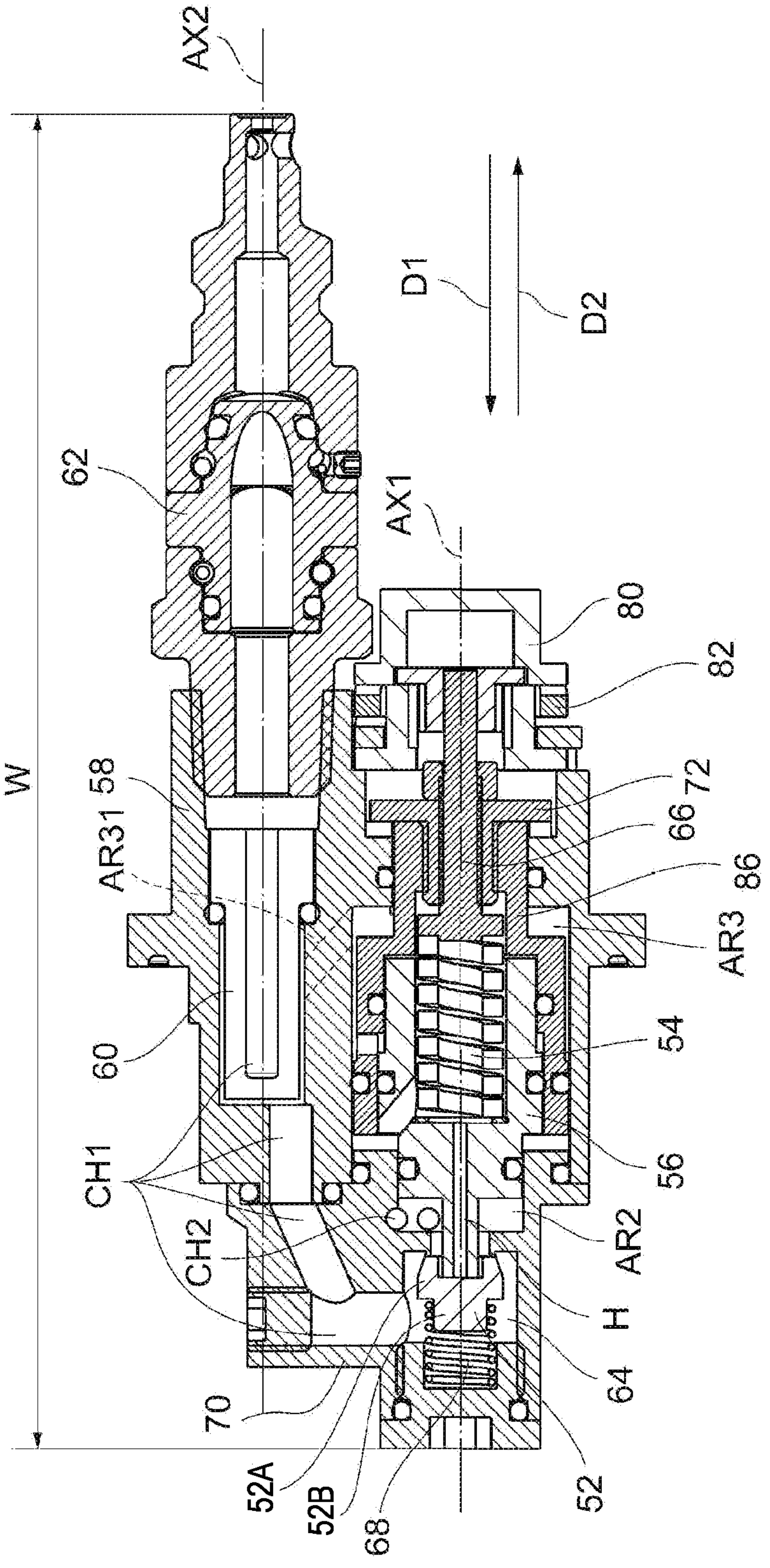
FIG. 3A is a sectional view taken along the line IIIA-IIIA in FIG. 2.
Figure 3B:
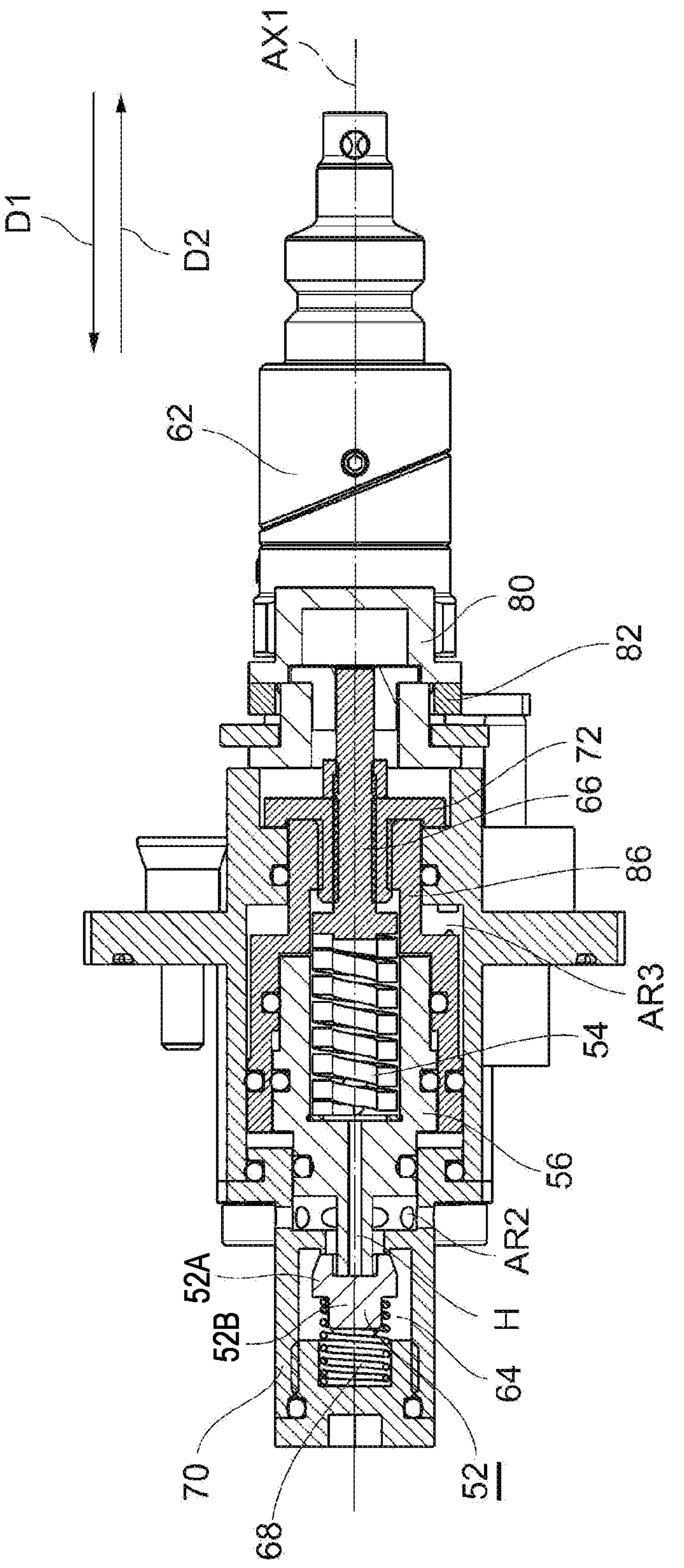
FIG. 3B is a sectional view taken along the line IIIB-IIIB in FIG. 2.
Figure 4:
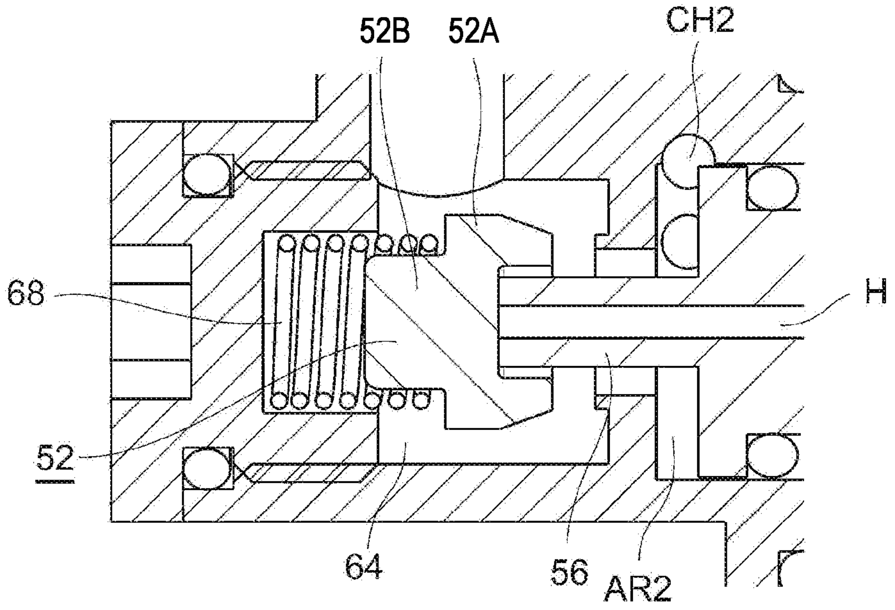
FIG. 4 is a partially enlarged view of the FIG. 3A when a valve opens in an intake direction.
Figure 5:
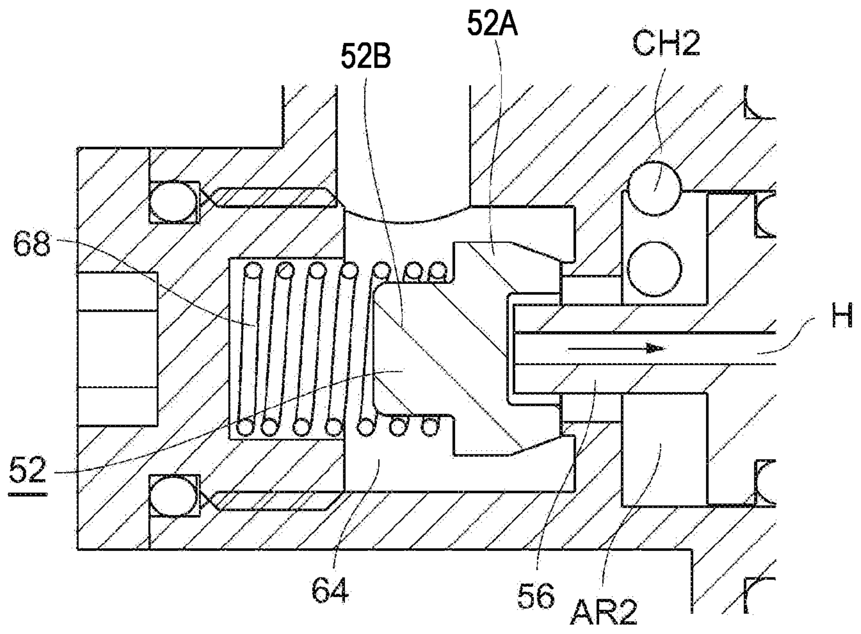
FIG. 5 is a partially enlarged view of the FIG. 3A when the valve opens in an exhaust direction.

Hereinafter, the configuration of the regulator 50 (an example of the "pressure adjusting mechanism") will be described with reference to the drawings. FIG. 2 is a front end view of the single regulator 50 before being assembled to the nailing tool 10 as viewed from the second direction D2. Meanwhile, the view after assembly corresponds to the view of the regulator 50 as viewed in the second direction D2 from the inside of the nailing tool 10 in FIG. 1. FIGS. 3A to 3D are sectional views taken along the lines IIIA-IIIA, IIIB-IIIB, IIIC-IIIC and IIID-IIID in FIG. 2, respectively. FIG. 4 is a partially enlarged view of the FIG. 3A when the compressed fluid in a valve chamber 64 flows into a secondary pressure region AR2, and FIG. 5 is a partially enlarged view of the FIG. 3A when the compressed fluid in the secondary pressure region AR2 is exhausted.

The regulator 50 includes a plug 62 (an example of the "air intake") for receiving compressed air supplied from the outside, a first end cap 58 to which the plug 62 is connected, an air filter 60 provided in the first end cap 58, a valve body 52 that is pressed in the second direction D2 by compressed air that has entered the valve chamber 64 from the first end cap 58 through a first flow path CH1, a valve spring 68 that presses the valve body 52 in the second direction D2, and a main spring 54 (an example of the "elastic body") that is arranged on the side facing the second direction D2 with respect to the valve body 52 and exerts a force on the valve body 52 toward the first direction D1.

Further, the regulator 50 includes a piston 56 (an example of the "piston component") arranged between the valve body 52 and the main spring 54, and an adjustment screw 66 (an example of the "screw component") that is arranged on the side facing the second direction D2 with respect to the main spring 54 and supports the main spring 54 by pressing an end of the main spring 54 in the first direction D1.

Meanwhile, as a pressure adjusting mechanism for changing the pressure of compressed air supplied to the drive mechanism 20 to adjust the pressure and a load reducing mechanism for reducing an operating load at the time of adjusting the pressure, the regulator 50 includes a dial 80, a spacer 72, a cam plate 82, a load release valve 84 (shown in FIG. 3C), and a load release piston 86, in addition to the adjustment screw 66. The configurations of these parts will be described in detail later.

The plug 62 is a component for receiving compressed air supplied from the outside. One end of the plug 62 is configured to allow an air hose (not shown) to be connected thereto. Therefore, the compressed air generated by the air compressor can be supplied to the plug 62 via the air hose. The other end of the plug 62 is connected to the first end cap 58. At this time, a flow path formed in the plug 62 communicates with the first flow path CH1 formed in the first end cap 58.

The plug 62 is mounted on a second axis AX2 (to be coaxial with the second axis AX2). A first axis AX1 (to be described later) and the second axis AX2 are two substantially parallel axes that are separated from each other. Further, the first axis AX1 and the second axis AX2 are parallel to the first direction D1 and the second direction D2.

The first flow path CH1 for supplying the compressed air supplied from the plug 62 into the valve chamber 64 is formed in the first end cap 58 to which the plug 62 is attached and in the parts from the first end cap 58 to the valve chamber 64 in which the valve body 52 is disposed. As shown in FIG. 3A, the valve chamber 64 is arranged at a position advanced in the first direction D1 from an end of the first end cap 58 in the second direction D2 and on the first axis AX1 that is vertically spaced from the second axis AX2. Therefore, the first flow path CH1 has a portion for advancing the compressed air in the first direction D1 and a portion for advancing the compressed air from the second axis AX2 to the first axis AX1.

The portion of the first flow path CH1 in the present embodiment for advancing the compressed air in the first direction D1 includes a flow path formed on the second axis AX2. However, the portion of the first flow path CH1 for advancing the compressed air in the first direction D1 does not necessarily have to be formed on the second axis AX2 parallel to the first direction D1, and may be formed to form an acute angle with respect to the first direction D1, for example.

The valve body 52 is a component for adjusting, together with the piston 56, the secondary pressure on the downstream side of the valve body 52. Specifically, when the secondary pressure on the downstream side drops, the valve body 52 moves in the first direction D1 to allow the compressed fluid on the upstream side having the primary pressure to flow into the downstream side, thereby raising the secondary pressure up to a predetermined pressure. Here, the primary pressure refers to the pressure on the upstream side of the valve body 52. Further, the secondary pressure refers to the pressure on the downstream side of the valve body 52.

As shown in FIG. 3A and the like, the valve body 52 according to the present embodiment has a cylindrical portion 52B located on the side facing the first direction D1 and formed in a cylindrical shape, and a truncated conical portion 52A formed integrally with the cylindrical portion 52B and located on the side facing the second direction D2. The truncated conical portion 52A is formed in a truncated conical shape whose bottom surface has a diameter larger than that of the cylindrical portion 52B. Further, a hole portion extending from an apex surface of the truncated conical portion 52A toward the cylindrical portion 52B is formed in the truncated conical portion 52A.

Of the apex surface of the truncated conical portion 52A formed in a circular shape, an outer edge portion is supported on a valve seat, and a region on the center side of the outer edge portion and a surface of the hole portion are exposed to the compressed fluid having the secondary pressure. The other portions of the valve body 52, that is, at least each bottom surface and each side surface of the cylindrical portion 52B and the truncated conical portion 52A are exposed to the compressed fluid having the primary pressure.

The valve body 52 is arranged on the first axis AX1 in the valve chamber 64 (to be coaxial with the first axis AX1). Since the first flow path CH1 communicates with the valve chamber 64, the compressed fluid having the primary pressure exists in the valve chamber 64. Since a bottom surface of the valve body 52 facing the first direction D1 (an example of the "first pressure receiving surface exposed to the primary pressure region") is exposed to the space in the valve chamber 64, the valve body 52 is pressed in the second direction D2 by the compressed fluid having the primary pressure.

Further, as shown in FIG. 3A, the valve body 52 is supported by the valve spring 68, which is a compression spring arranged on the side facing the first direction D1 with respect to the valve body 52. Therefore, the valve body 52 is pressed in the second direction D2 by an urging force according to a compression amount of the valve spring 68 and a pressure of the compressed fluid having the primary pressure exposed on the surface of the valve body 52 facing the first direction D1. Meanwhile, the valve spring 68 is arranged to surround the cylindrical portion 52B in a cylindrical space provided in a component attached to a second end cap 70 provided at an end of the regulator 50 in the first direction D1. An end of the valve spring 68 engages with a bottom surface of the truncated conical portion 52A.

On the other hand, the apex surface of the valve body 52 facing the second direction D2 is pressed in the first direction D1 by the piston 56 and the valve seat supporting the valve body 52. Since the piston 56 is pressed in the first direction D1 by the main spring 54, it can be said that the main spring 54 presses the valve body 52 in the first direction D1 via the piston 56. Further, a part of the apex surface of the valve body 52 is exposed to the secondary pressure region AR2. Therefore, the valve body 52 is pressed in the first direction D1 by an urging force according to a compression amount of the main spring 54 and a pressure of the compressed fluid having the secondary pressure exposed on the surface of the valve body 52 facing the second direction D2. In addition, the valve body 52 is configured such that its movement in the second direction D2 is restricted by the valve seat. The pressure regulation action by a mechanism including such a valve body 52 will be described in detail later.

In an equilibrium state where the secondary pressure becomes a predetermined pressure, a part of the apex surface of the valve body 52 is in close contact with the valve seat, so that the valve chamber 64 (an example of the "primary pressure region") and the secondary pressure region AR2, which is a region on the side facing the second direction D2 with respect to the valve body 52, do not communicate with each other. However, when the secondary pressure drops, the valve body 52 moves away from the valve seat in the first direction D1 as described later (see FIG. 4), so that the valve chamber 64 and the secondary pressure region AR2 on the downstream side communicate with each other and the compressed fluid having the primary pressure flows into the downstream side. As a result, the secondary pressure can be increased.

The piston 56 transmits the urging force by the main spring 54 to the valve body 52 and presses the valve body 52 in the first direction D1. Further, when the secondary pressure rises above the predetermined pressure, the compressed fluid in the secondary pressure region AR2 is exhausted and the secondary pressure is lowered.

The piston 56 is arranged on the first axis AX1 (to be coaxial with the first axis AX1). Since the secondary pressure region AR2 communicates with a second flow path CH2 (an example of the "secondary pressure flow path") for supplying compressed fluid to the drive mechanism 20 and a surface of the piston 56 facing the first direction D1 (an example of the "second pressure receiving surface exposed to the secondary pressure region") is exposed to the secondary pressure region AR2, the piston 56 is pressed in the second direction D2 by the compressed fluid having the secondary pressure. That is, the second pressure receiving surface is pressed in a direction of closing the flow paths CH1, CH2 by receiving air pressure in the air chamber 34.

Further, a cylindrical space (spring seat) centered on the first axis AX1 is provided at an end of the piston 56 in the second direction D2. The main spring 54 is arranged in the cylindrical space. The piston 56 is pressed in the first direction D1 by the main spring 54, which is a compression spring. Meanwhile, the cylindrical space is maintained at atmospheric pressure.

Furthermore, an end of the piston 56 in the first direction D1 extends in a cylindrical shape with the first axis AX1 as a central axis and comes into contact with the apex surface of the valve body 52. A through-hole H communicating with the cylindrical space maintained at atmospheric pressure is formed in the portion extending in the cylindrical shape.

In the equilibrium state where the secondary pressure becomes the predetermined pressure, the urging force from the main spring 54 that exerts a force on the piston 56 toward the first direction D1 and the force received from the valve body 52 and the compressed air having the secondary pressure that exerts a force toward the second direction D2 are balanced. Therefore, the piston 56 does not move.

However, when the secondary pressure drops below the predetermined pressure, the force of the compressed air having the secondary pressure for pressing the piston 56 in the second direction D2 on the second pressure receiving surface decreases, so that the piston 56 and the valve body 52 pressed by the piston 56 move in the first direction D1. Therefore, the valve configured by the valve body 52 is opened in an intake direction (see FIG. 4). In this way, the valve chamber 64, which is the primary pressure region, and the secondary pressure region AR2 communicate with each other, and the compressed air having the primary pressure flows into the downstream side, so that the secondary pressure can be increased. When the secondary pressure rises to the predetermined pressure, the valve body 52 returns in the second direction D2 and the valve is closed, so that an equilibrium state is obtained.

On the other hand, when the secondary pressure rises above the predetermined pressure, the force of the compressed air having the secondary pressure for pressing the second pressure receiving surface of the piston 56 in the second direction D2 increases, so that the piston 56 moves in the second direction D2. Therefore, a slight gap is formed between the piston 56 and the valve body 52, which does not move in the second direction D2 by being restrained by the valve seat (see FIG. 5).

Since the through-hole H is formed in the portion of the piston 56 extending in a cylindrical shape, at this time, the valve configured by the valve body 52 is opened in an exhaust direction, and the compressed air in the secondary pressure region AR2 is exhausted to a space maintained at atmospheric pressure via the through-hole H, as indicated by the arrow in FIG. 5. In this way, the secondary pressure can be reduced. When the secondary pressure is reduced to the predetermined pressure, the piston 56 returns in the first direction D1 and is in an equilibrium state. With the above operation, the regulator 50 is configured to be able to maintain the secondary pressure at the predetermined pressure. For example, the predetermined pressure of the secondary pressure is set to 2.3 MPa. However, the present disclosure can be applied to a pressure adjusting mechanism having other configurations.

The main spring 54 presses the valve body 52 in the first direction D1 via the piston 56. The main spring 54 is arranged on the first axis AX1 (to be coaxial with the first axis AX1). Since it is necessary to move the valve body 52 pressed in the second direction D2 by the valve spring 68 in the first direction D1 when the secondary pressure is reduced, the main spring 54 is configured to be able to press the valve body 52 with a stronger force than the valve spring 68.

An end of the main spring 54 in the first direction D1 is in contact with the piston 56, and an end thereof in the second direction D2 is supported by the adjustment screw 66. Therefore, an initial load of the main spring 54 can be adjusted by changing the position of the adjustment screw 66 or by inserting a washer or the like between the adjustment screw 66 and the main spring 54.

The adjustment screw 66 presses the main spring 54 in the first direction D1. Further, the adjustment screw 66 is arranged on the first axis AX1 (to be coaxial with the first axis AX1). That is, the valve body 52, the piston 56, the main spring 54, and the adjustment screw 66 are arranged in this order on the first axis AX1 in the second direction D2 toward the outside of the nailing tool 10. In addition, the plug 62 and at least a part of the first flow path CH1 are arranged on the second axis AX2.

Therefore, the position of the end of the main spring 54 in the second direction D2 can be easily adjusted by removing the dial 80 and changing the position of the adjustment screw 66 or by inserting a washer or the like. A malfunction of a pneumatic tool will occur when the initial load of the main spring 54 is shifted to the low pressure side, and the amount of the compressed air consumed by the drive mechanism is increased when the initial load of the main spring 54 is shifted to the high pressure side. Thereby, the merit of installing a regulator will be diminished. However, according to the nailing tool 10 of the present embodiment, the adjustment screw 66 is arranged on the outer side of the valve body 52, the piston 56 and the main spring 54, so that the initial load of the main spring 54 can be easily adjusted. Therefore, it is possible to improve the assembling property of the nailing tool 10.

That is, since each spring has a characteristic that a variation in load characteristic is large, as described above, simply assembling a regulator will result in mounting a regulator with different load characteristics for each pneumatic tool. Therefore, after assembling a regulator, the variation in load characteristic of the regulator is eliminated by inserting a washer or by adjusting a screw for adjusting the initial load.

Since the contact state between one end of the spring and the piston must be maintained at the time of adjusting the load characteristic, it is necessary to provide the pressure adjusting mechanism on the other end side of the spring. However, in the case of a pneumatic tool in the related art, a spring is provided on the inner side of a pneumatic tool than a piston, and thus, a pressure adjusting mechanism is also provided on the inner side of a pneumatic tool than a piston. In order to operate the pressure adjusting mechanism in such a situation, it is conceivable to expose an operating part of the pressure adjusting mechanism from the pneumatic tool. However, for that purpose, it is necessary to form a hole in a grip used as an air chamber, which is not realistic.

In the nailing tool 10 according to the present embodiment, the main spring 54, which is an elastic body, is arranged outside the valve body 52, that is, at a position close to the air intake, so that the variation in load characteristic of the main spring 54 can be easily adjusted.

Further, the valve body 52, the piston 56 and the main spring 54 are arranged on the first axis AX1, while the plug 62 upstream of the valve body 52 is arranged on the second axis AX2 different from the first axis AX1. As a result of such a configuration, the plug 62 can be moved to the first direction side as compared with the conventional case, and only the end of the plug 62 in the second direction D2, not the entire plug 62, can be arranged to protrude from the other portion of the nailing tool 10 (see FIG. 1).

At this time, in the first direction D1, the region where the main spring 54 is provided (region from the end of the main spring 54 in the first direction D1 to the end of the main spring 54 in the second direction D2) and the region where the first flow path CH1 is provided are at least partially overlapped. Especially, in the case of the regulator 50 shown in the present embodiment, in the first direction D1, the region where the main spring 54 is provided and the region where the piston 56 is provided are included in the region where the first flow path CH1 is provided (from the end of the first end cap 58 in the second direction D2 to the end of the flow path reaching the valve chamber 64 in the first direction D1). As a result of such a configuration, the full length W (shown in FIG. 3A) of the regulator 50 in the first direction D1 can be made smaller than that of the regulator in the related art. That is, the amount of protrusion of the plug 62 can be suppressed, and the full length of the nailing tool 10 can be shortened.

Further, since there is a margin in the region on the second axis AX2, the large air filter 60 can be provided on the second axis AX2 (to be coaxial with the second axis AX2), as shown in FIG. 3A. As a result, it is possible to reduce the possibility that the regulator 50 cannot operate normally due to dust being mixed inside the regulator 50 and meshing with the valve body 52 or the like. However, the air filter 60 may be omitted or miniaturized, and the plug 62 may be additionally arranged on the side facing the first direction D1.

[Load Reducing Mechanism]

Hereinafter, the pressure adjusting mechanism and the load reducing mechanism included in the regulator 50 will be described with reference to FIGS. 6A to 9. The pressure adjusting mechanism allows the regulator 50 to adjust the secondary pressure. Therefore, the impact force of the nailing tool 10 can be changed according to the type of fastener and workpiece. Further, the load reducing mechanism according to the present embodiment makes it possible to temporarily reduce the load applied to a user when adjusting the pressure.

First, the outline of each mechanism will be described, and then the specific configuration of each mechanism will be described. The pressure adjusting mechanism further includes the dial 80, the spacer 72, and the adjustment screw 66, in addition to the valve body 52, the main spring 54, and the pressure receiving member described above. Further, the load reducing mechanism includes the cam plate 82, the load release valve 84, and the load release piston 86.

The load release piston 86 is an example of a support part that supports the end of the main spring 54 in the second direction D2, and is located on the side facing the second direction D2 with respect to the piston 56. The load release piston 86 can move relative to the piston 56. When an operation is input to an operation input part such as the dial 80, the load release piston 86 moves to the side facing the second direction D2 opposite to the side facing the first direction D1 where the valve body 52 is located.

When a user turns the dial 80 (an example of the "operation input part"), the pressure adjusting mechanism changes the position of the "support part," which is a component that defines the position of the end of the main sparing 54 in the second direction D2. The amount of compression of the main spring 54 varies according to the position of the end of the main spring 54 in the second direction D2. Therefore, the secondary pressure can be adjusted by changing the position of the load release piston 86. In the present embodiment, by providing a slope at the contact portion between the spacer 72 rotating together with the dial 80 and the first end cap 58, the position of the spacer 72 with respect to the first end cap

58 is displaced in an axial direction according to the rotation position of the dial 80 (the spacer 72).

Since the component that defines the position of the end of the main spring 54 in the second direction D2 is integrally formed with the spacer 72, the position of the end of the main spring 54 in the second direction D2 can be displaced by operating the dial 80 and the spring force of the main spring 54 can be adjusted. Further, since the spacer 72 is integrally formed with the load release piston 86, an axial force of the load release piston 86 in the first direction D1 generates a force for pressing, in the direction (first direction D1) of compressing the main spring 54, the component that defines the position of the end of the main spring 54 in the second direction D2.

The load reducing mechanism extends the main spring 54 when the dial 80 is turned. When the main spring 54 is extended, the urging force acting on the adjustment screw 66 from the main spring 54 can be weakened, so that the operating load at the time of adjusting the pressure can be reduced. In the present embodiment, the load release piston 86 is normally pressed in the first direction by exposing the surface of the load release piston 86 facing the second direction D2 to a load release region AR3, which is the primary pressure region. The load release region AR3 is a closed space facing the load release piston 86 and defined on the side (the side facing the second direction D2) opposite to the valve body 52 with the load release piston 86 interposed therebetween.

When the dial 80 is turned, the load release valve 84 that follows the operation of the dial 80 causes the load release region AR3 to be opened to atmospheric pressure or to be depressurized. As a result, the load release piston 86 can move in the second direction D2, so that the main spring 54 can be extended to its natural length or near the natural length. Therefore, the urging force acting on the adjustment screw 66 from the main spring 54 can be weakened. Since the adjustment screw 66 is engaged with the dial 80, it is possible to reduce the load applied to the user when the dial 80 is turned. The specific configuration will be outlined below.

Figure 3C:
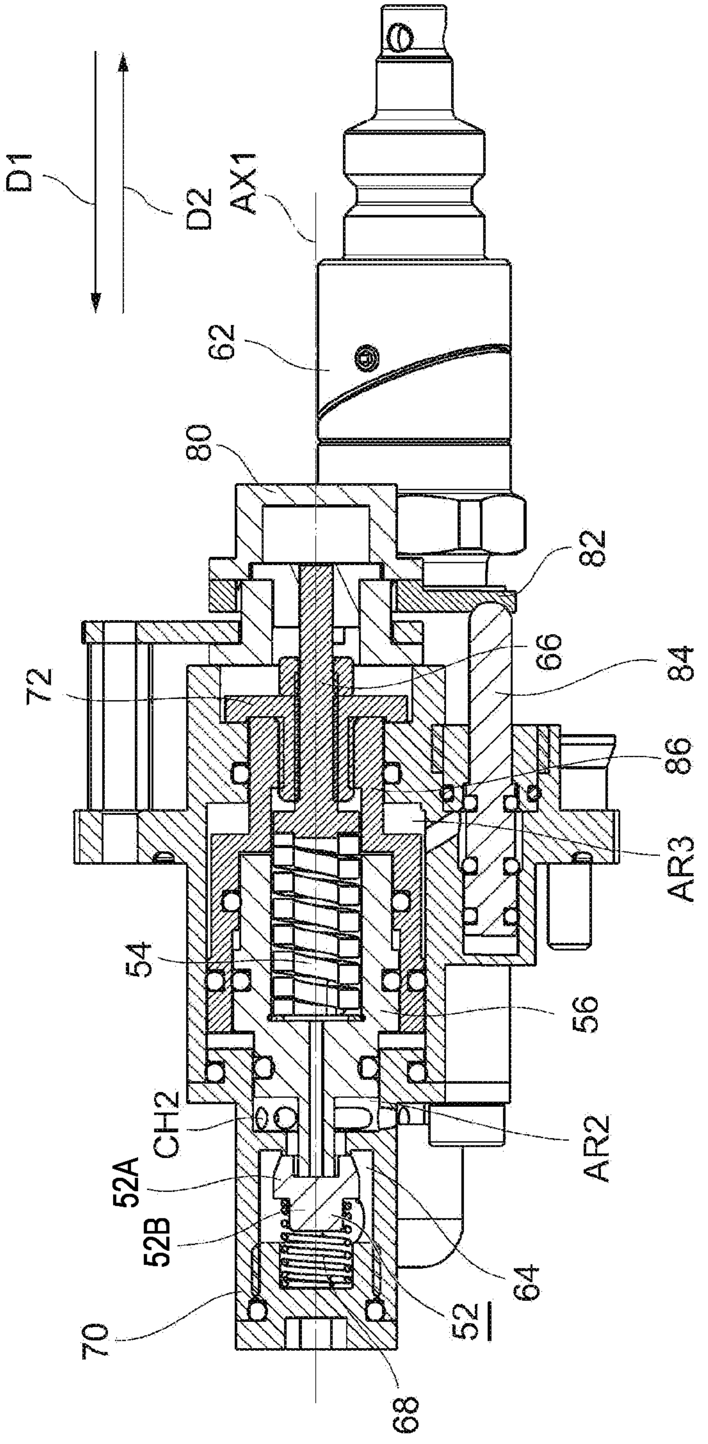
FIG. 3C is a sectional view taken along the line IIIC-IIIC in FIG. 2.
Figure 3D:
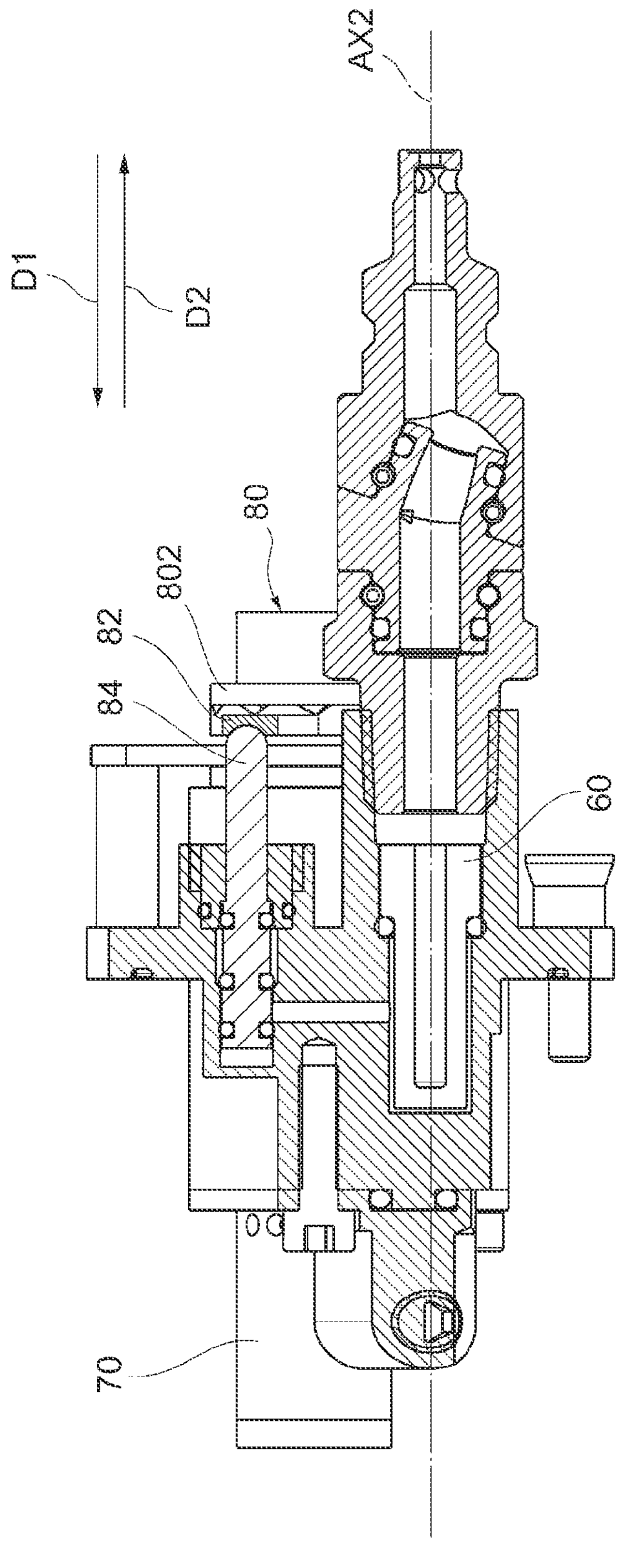
FIG. 3D is a sectional view taken along the line IIID-IIID in FIG. 2.
Figure 6A:
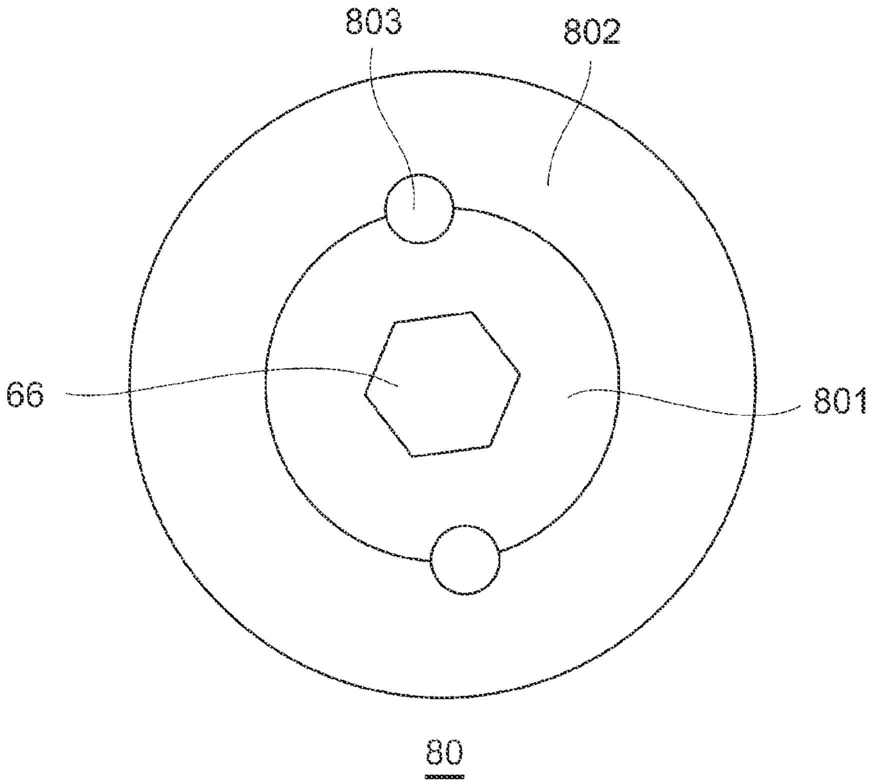
FIG. 6A is an enlarged view of a dial shown in FIG. 3C as viewed from a first direction.
Figure 6B:
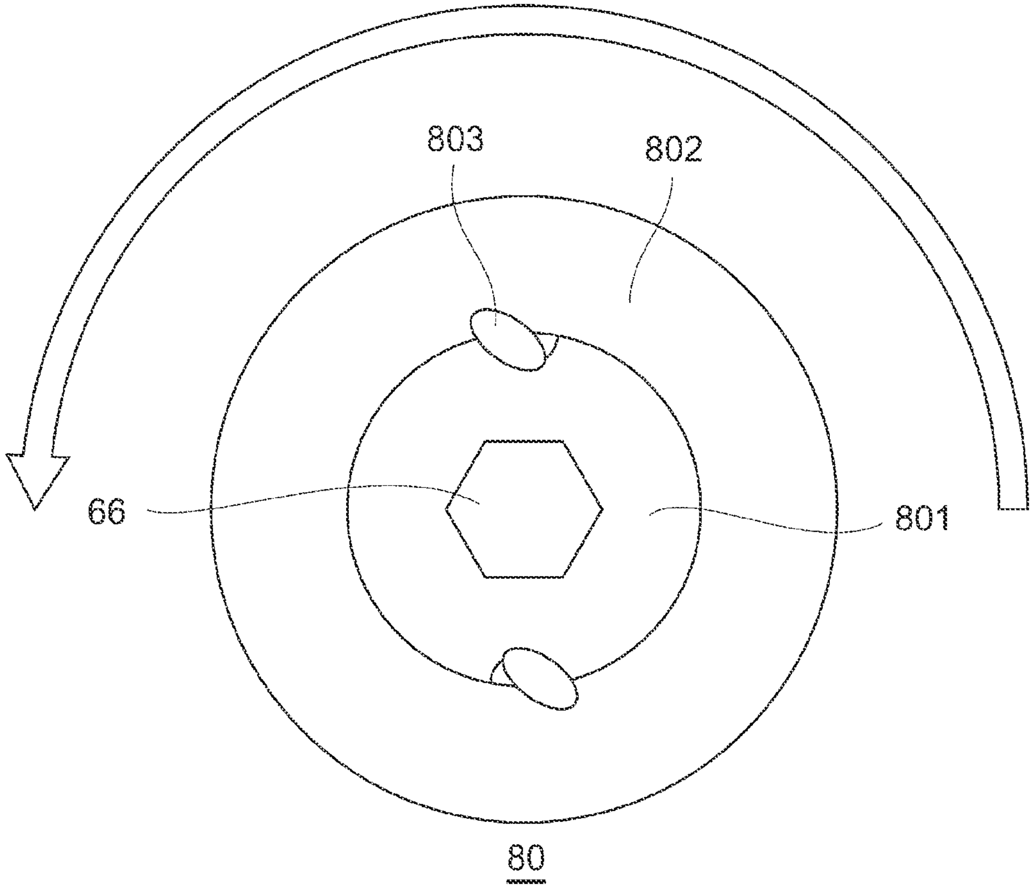
FIG. 6B is an enlarged view showing a state in which an operation is input to the dial shown in FIG. 6A.

FIG. 6A is an enlarged view of the dial 80 shown in FIG. 3C as viewed from the first direction D1. FIG. 6B is an enlarged view showing a state in which an operation is input by rotating the dial 80 shown in FIG. 6A. As shown in FIGS. 6A and 6B, the dial 80 is configured to be rotatable about the first axis AX1. The dial 80 includes an inner dial 801 formed in a substantially disk shape, an outer dial 802 surrounding the inner dial 801 from the outside in a radial direction, and an elastic member 803 connecting the inner dial 801 and the outer dial 802. The elastic member 803 is formed of, for example, rubber or the like to have a columnar shape. Concave portions for accommodating the elastic member 803 are formed on an outer peripheral surface of the inner dial 801 and an inner peripheral surface of the outer dial 802.

The inner dial 801 is fixed to the adjustment screw 66 described above and is fixed to the load release piston 86 via the adjustment screw 66. In a state where the load release valve 84 (to be described later) is not opened, the urging force acting on the inner dial 801 from the main spring 54 is large. Therefore, when pinching the outer dial 802 to rotate the dial 80, the inner dial 801 having a large rotational resistance does not rotate, whereas only the outer dial 802 rotates with respect to the inner dial 801 while elastically deforming the elastic member 803.

Figure 7:
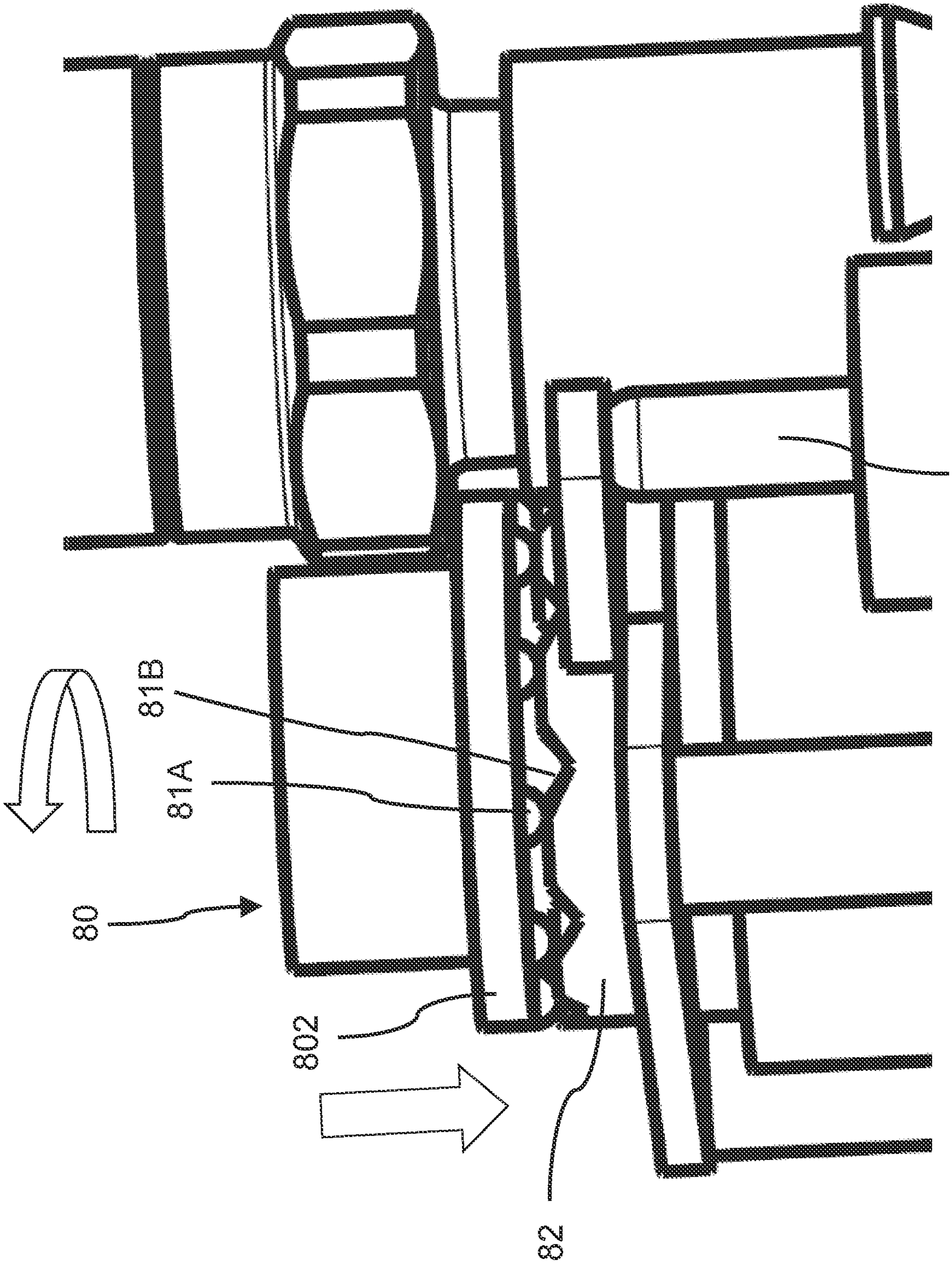
FIG. 7 is a perspective view of the dial shown in FIG. 6B as viewed obliquely.

FIG. 7 is a perspective view of the dial 80 shown in FIG. 6B as viewed obliquely. As shown in FIG. 7, the dial 80 is in contact with the cam plate 82. The dial 80 is configured so that the cam plate 82 is displaced in the first direction D1 when the outer dial 802 of the dial 80 is rotated. Specifically, on the surface of the outer dial 802 in contact with the cam plate 82, a plurality of convex portions 81A are periodically provided to be rotationally symmetrically about the first axis AX1.

On the other hand, on the surface of the cam plate 82 in contact with the outer dial 802, a plurality of concave portion 81B are provided in the same period to be rotationally symmetrically about the first axis AX1. With this configuration, as the outer dial 802 rotates, the position of the cam plate 82 in the first direction D1 can be displaced depending on whether the convex portions 81A and the concave portions 81B face each other or not.

As shown in FIG. 7, the cam plate 82 is in contact with an end of the load release valve 84 in the second direction D2. Therefore, the load release valve 84 is displaced in the first direction D1 with the displacement of the cam plate 82 in the first direction D1. The load release valve 84 is switched from a valve closed state to a valve opened state when it is displaced in the first direction D1

In the valve closed state before movement, an O-ring 84A of the load release valve 84 is pressed against a cylindrical inner wall surface opposing thereto. Therefore, the load release region AR3 and a depressurized flow path AR32 communicating with the load release region AR3 are sealed with respect to an open region AR4 opening to atmospheric pressure. Since the load release region AR3 communicates with the first flow path CH1 by a pressurized flow path AR31 (see FIG. 3A), the load release region AR3 and the depressurized flow path AR32 are maintained at the primary pressure. When the load release valve 84 is displaced in the first direction D1 by the cam plate 82, the load release valve 84 is switched from the valve closed state to the valve opened state, and the load release region AR3 is opened to atmospheric pressure or depressurized.

Figure 8:
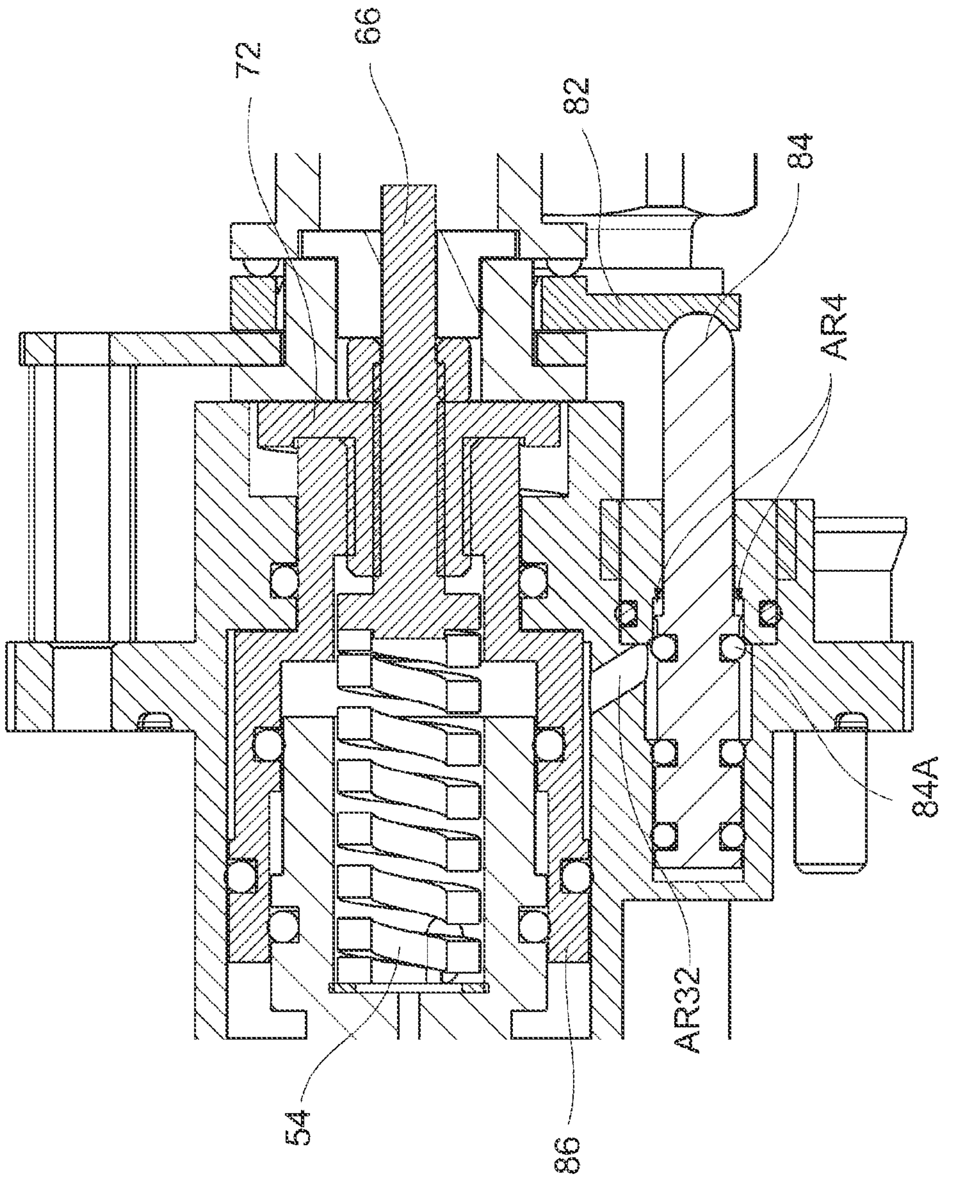
FIG. 8 is a partially enlarged view of the FIG. 3A when a main spring is extended to its natural length in a valve opened state.

FIG. 8 is a partially enlarged view of the FIG. 3A when the main spring 54 is extended to its natural length in the valve opened state. As shown in FIG. 8, the cylindrical inner wall surface facing the load release valve 84 is formed to have a slightly larger diameter so as not to sufficiently contact with the O-ring 84A when the load release valve 84 moves in the first direction D1. Therefore, when the load release valve 84 moves in the first direction D1, the load release region AR3 and the depressurized flow path AR32 communicating with the load release region AR3 are in the valve opened state where they are not completely sealed with respect to the open region AR4 opening to atmospheric pressure and communicate with the open region AR4.

As a result, the compressed air in the load release region AR3 that is pressing the load release piston 86 in the first direction D1 is exhausted, and the load release piston 86 is in a state of being movable in the second direction D2. Therefore, the main spring 54 extends while moving the load release piston 86 in the second direction D2. In this way, the urging force acting on the adjustment screw 66 from the main spring 54 can be weakened.

When the urging force of the main spring 54 acting on the inner dial 801 described above is weakened, the rotational resistance of the inner dial 801 is greatly reduced. Due to the restoring force of the elastic member 803 that is elastically deformed as shown in FIG. 6B, the inner dial 801 rotates to the same position as the outer dial 802 and returns to the state shown in FIG. 6A. In this way, when the convex portions and the concave portions face each other again, the cam plate 82 is displaced in the second direction D2. As a result, the load release valve 84 is also displaced in the second direction D2 and returns to its initial position. Meanwhile, a compression spring for urging the load release valve 84 in the second direction D2 may be provided at an end of the load release valve 84 in the first direction D1.

When the load release valve 84 is displaced in the second direction D2 and returns its original position, the load release region AR3 and the depressurized flow path AR32 communicating with the load release region AR3 are sealed again with respect to the open region AR4 opening to atmospheric pressure. Since the load release region AR3 communicates with the first flow path CH1 by the pressurized flow path AR31 shown in FIG. 3A, the load release region AR3 rises to the primary pressure. As a result, the load release piston 86 is displaced in the first direction D1.

As a result, the main spring 54 is compressed, and the piston 56 supported by the load release piston 86 at the end in the second direction D2 is pressed in the first direction D1 by the main spring 54. In the illustrated example, the spacer 72 and the load release piston 86 are configured as an integral structure. The spacer 72 and the load release piston 86 may be formed separately and fixed to each other. When the load release region AR3 rises to the primary pressure, the load release piston 86 moves in the first direction D1 together with the spacer 72.

The position of the end of the main spring 54 in the second direction D2 is also displaced in the first direction D1, but at this time, the slope provided on the spacer 72 rotating with the dial 80 comes into contact with the first end cap 58 to determine the amount of displacement of the load release piston 86 in the first direction D1. That is, the distance between the spacer 72 and the first end cap 58 can be adjusted by rotating the dial 80. Therefore, it is possible to adjust the pressure by weakening the compressive force of the main spring 54. Further, the present disclosure is not limited to a structure in which the amount of displacement can be adjusted steplessly by the slope, and an engaging portion may be formed in a stepped shape to adjust the amount of displacement in a stepwise manner. When an inclination angle of the slope is increased, the amount of displacement can be increased when the dial 80 is rotated by a predetermined angle.

Figure 9:
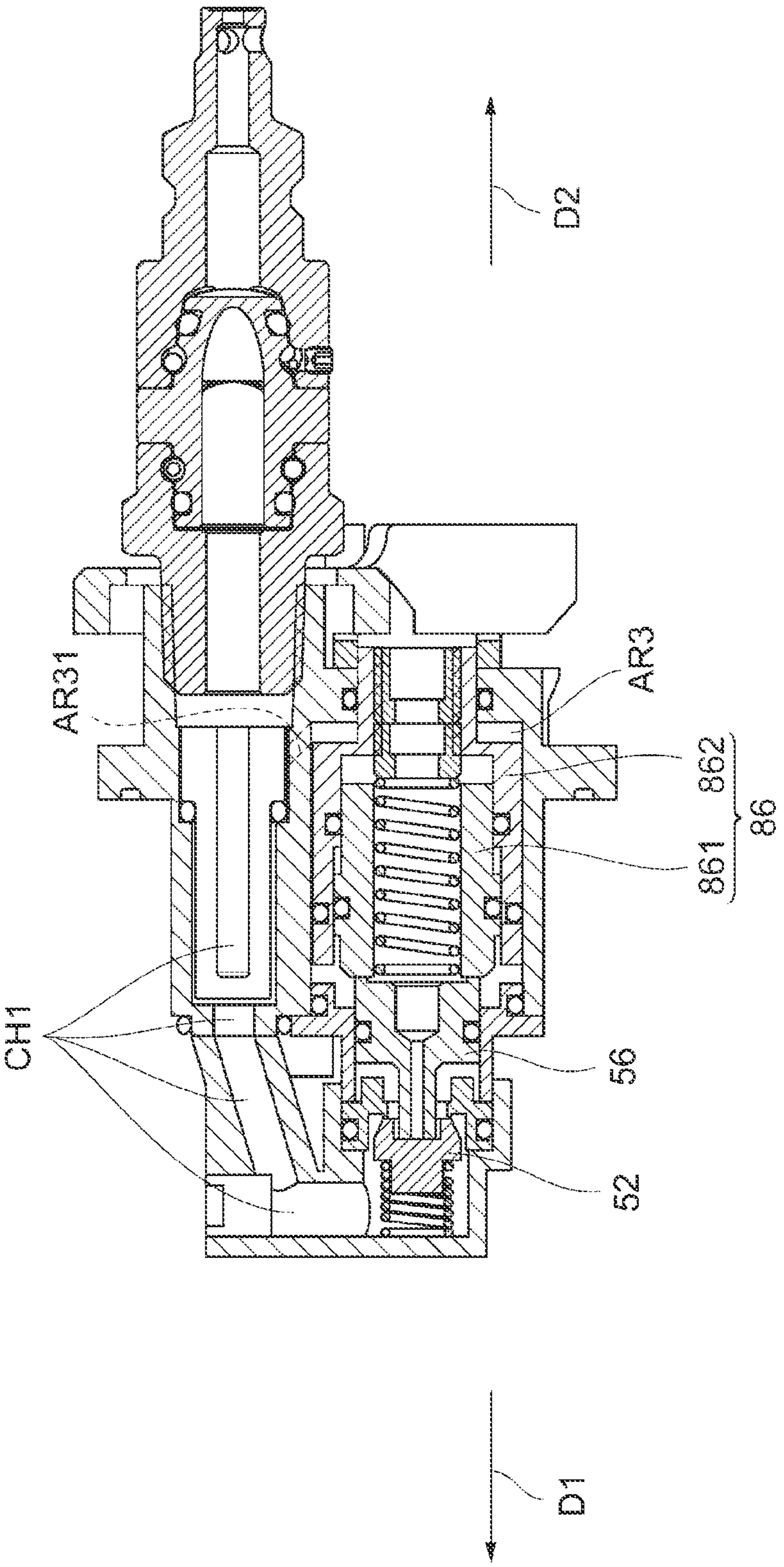
FIG. 9 is a sectional view showing a modification of a load reducing mechanism shown in FIG. 8.

FIG. 9 is a sectional view showing a modification of the load reducing mechanism shown in FIG. 8. This modification is different from the present embodiment in that the load release piston 86 further includes an inner cylindrical portion 861 fitted inside an outer cylindrical portion 862, in addition to the outer cylindrical portion 862 configured as the support part. The inner cylindrical portion 861 is formed in a cylindrical shape through which the main spring 54 is inserted. The shape of the inner cylindrical portion 861 may be a cylindrical shape or a square tubular shape.

The outer cylindrical portion 862 is configured to be slidable along the inner cylindrical portion 861 surrounding the main spring 54. The end of the main spring 54 on the side facing the second direction D2 is supported by the outer cylindrical portion 862. The end of the main spring 54 on the side facing the first direction D1 penetrates the inner cylindrical portion 861 and faces the piston 56. Even with the configuration of the modification shown in FIG. 9, the operating load of the pressure adjusting mechanism can be reduced as in the configuration shown in FIG. 8.

[Primary Pressure Balance Mechanism]

Hereinafter, a primary pressure balance mechanism included in the regulator 50 will be described with reference to FIGS. 10 to 12. It is known that when a primary pressure becomes low, the valve body 52 is pushed to the primary side to open the valve, and a secondary pressure becomes high. The primary pressure balance mechanism has a structure in which a primary pressure is applied to the piston 56 to constantly apply a load in the first direction D1 to the piston 56. The primary pressure balance mechanism reduces the influence of the primary pressure on the secondary pressure by cancelling at least a part of the fluctuation in the primary pressure.

Figure 10:
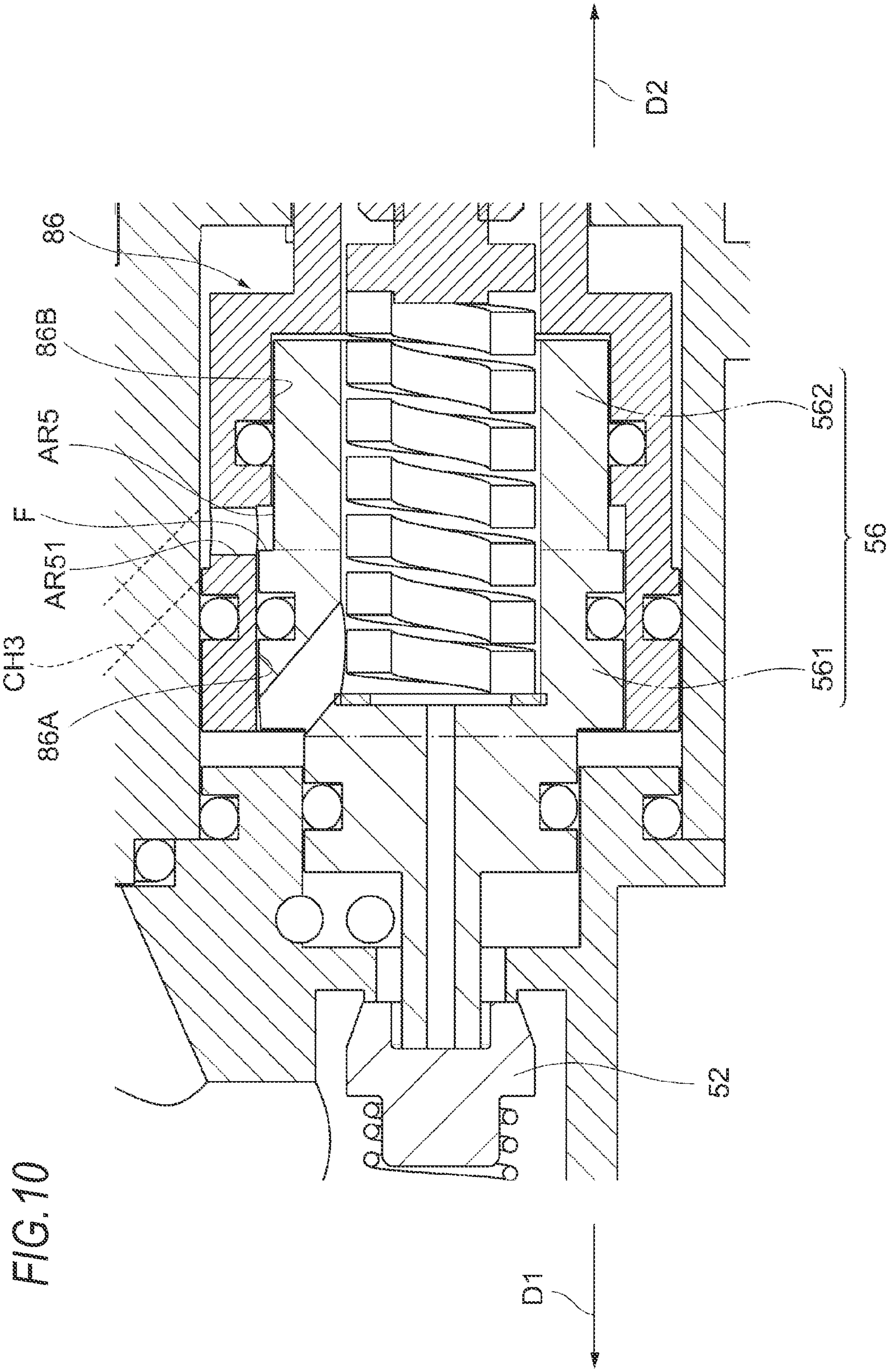
FIG. 10 is a partially enlarged view of the FIG. 3A when the valve is closed.

FIG. 10 is a partially enlarged view of the FIG. 3A when the valve is closed. As shown in FIG. 10, the primary pressure balance mechanism includes flow paths CH3 and AR51 that introduce the compressed fluid on the primary side (upstream side from the valve body 52) into the secondary side (downstream side from the valve body 52), and a third pressure receiving surface F that receives pressure from the compressed fluid introduced from the primary side.

In the illustrated example, the piston 56 has a columnar enlarged diameter portion 561 and a columnar reduced diameter portion 562 having a diameter smaller than that of the enlarged diameter portion 561. In the piston 56, the enlarged diameter portion 561 is provided on the side facing the first direction D1, and the reduced diameter portion 562 is provided on the side facing the second direction D2. The third pressure receiving surface F having an annular shape is formed at the boundary between the enlarged diameter portion 561 and the reduced diameter portion 562. The shape of the third pressure receiving surface F is not limited to the illustrated example. For example, when the columnar portions 561, 562 have the same diameter, an outer peripheral surface of the columnar portion 562 on the side facing the second direction D2 may be cut out to form the third pressure receiving surface F having a notch shape.

The load release piston 86 has a substantially cylindrical portion. The load release piston 86 has a first inner peripheral surface 86A that is in sliding contact with at least a part of an outer peripheral surface of the enlarged diameter portion 561, and a second inner peripheral surface 86B that is in sliding contact with at least a part of an outer peripheral surface of the reduced diameter portion 562. As shown in FIG. 7, a space AR5 is defined by the first inner peripheral surface 86A, the outer peripheral surface of the reduced diameter portion 562, and the third pressure receiving surface F of the enlarged diameter portion 561. In the following description, the space may be referred to as a primary pressure balance region AR5. The flow path CH3 penetrating the first inner peripheral surface 86A is formed in the load release piston 86. The flow path CH3 is connected to a bypass flow path (not shown) branched from the flow path CH1 on the primary side. The bypass flow path is formed to straddle the second axis AX2 and the first axis AX1. The compressed air on the primary side is introduced into the primary pressure balance region AR5 through the flow path CH3. The third pressure receiving surface F receives air pressure on the upstream side of the valve body 52 and is pressed in a direction of opening the flow paths CH1. CH2.

The valve body 52 and the third pressure receiving surface F receive a common primary pressure and are pressed in opposite directions. At the valve body 52 and the third pressure receiving surface F pressed in opposite directions, at least a part of a force corresponding to fluctuation in the primary pressure is cancelled out. Meanwhile, the area of the third pressure receiving surface F as viewed from the first direction D1 is smaller than that of a bottom surface of the cylindrical portion 52B of the valve body 52 as viewed from the second direction D2. Since the valve body 52 receives a larger force from the primary pressure than the third pressure receiving surface F, the valve body 52 can push back the piston 56 until it is balanced with the main spring 54 and the secondary pressure. In the illustrated example, the third pressure receiving surface F is formed to be smaller than the above-described second pressure receiving surface (the surface of the piston 56 facing the first direction D1).

Figure 11:
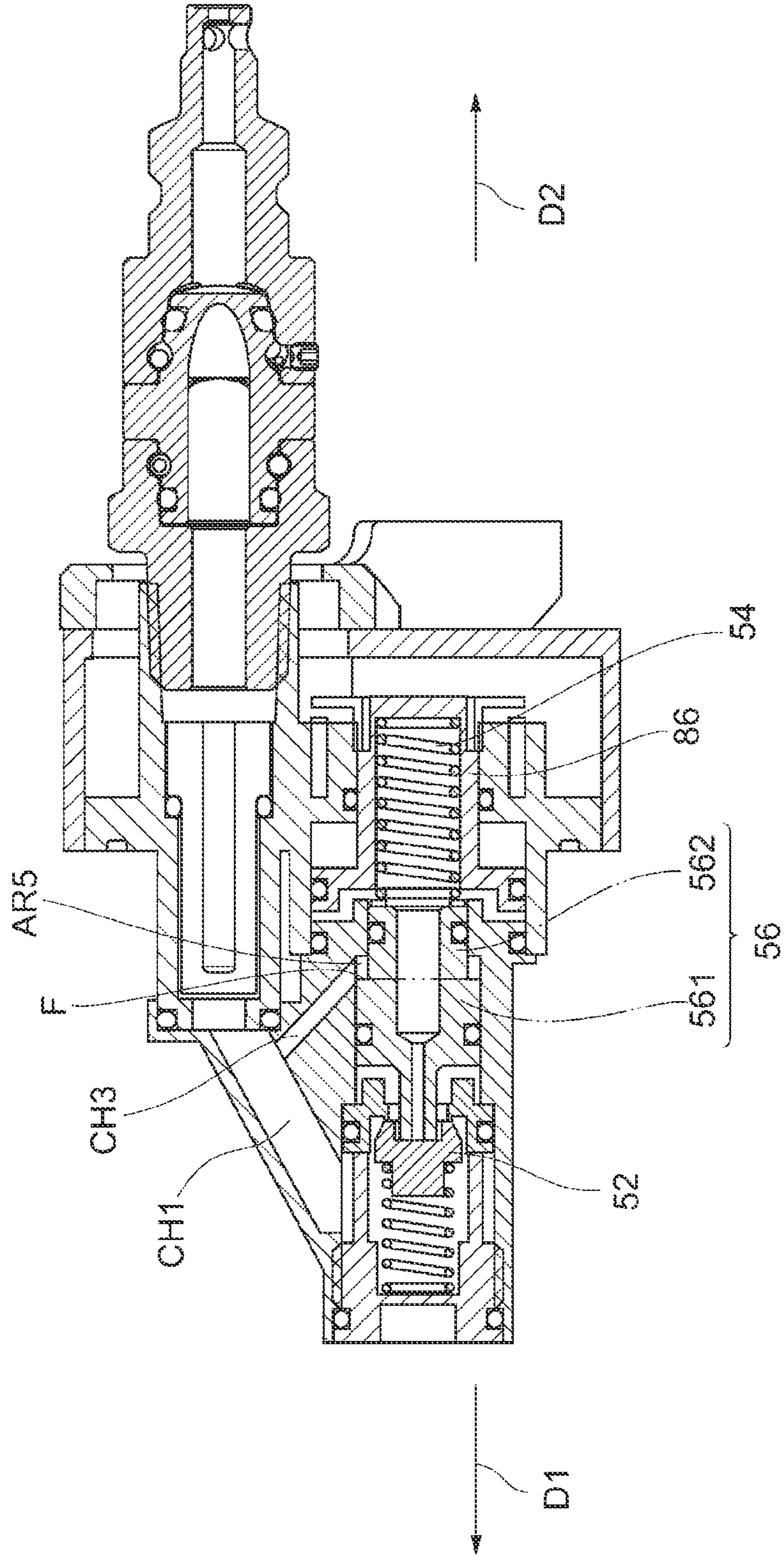
FIG. 11 is a sectional view showing a first modification of a primary pressure balance mechanism shown in FIG. 10.

FIG. 11 is a sectional view showing a first modification of the primary pressure balance mechanism shown in FIG. 10. The first modification is different from the present embodiment in that the piston 56 slides along a housing constituting the regulator 50 instead of the load release piston 86, and a bypass flow path CH3 branched from the flow path CH1 on the primary side and communicating with the primary pressure balance region AR5 is formed in the housing. As shown in FIG. 8, the bypass flow path CH3 is formed to straddle the second axis AX2 and the first axis AX1.

In the illustrated example, the load release piston 86 is arranged on the side facing the second direction D2 with respect to the piston 56. The main spring 54 is fitted inside the load release piston 86 formed in a cylindrical shape. The main spring 54 urges the end of the piston 56 on the side facing the second direction D2 toward the first direction D1. Even in the primary pressure balance mechanism of this modification, similarly to the primary pressure balance mechanism of the present embodiment, the primary pressure is applied to the piston 56 to constantly apply a load in the first direction D1 to the piston 56, and thus, the influence of the primary pressure on the secondary pressure can be reduced.

Figure 12:
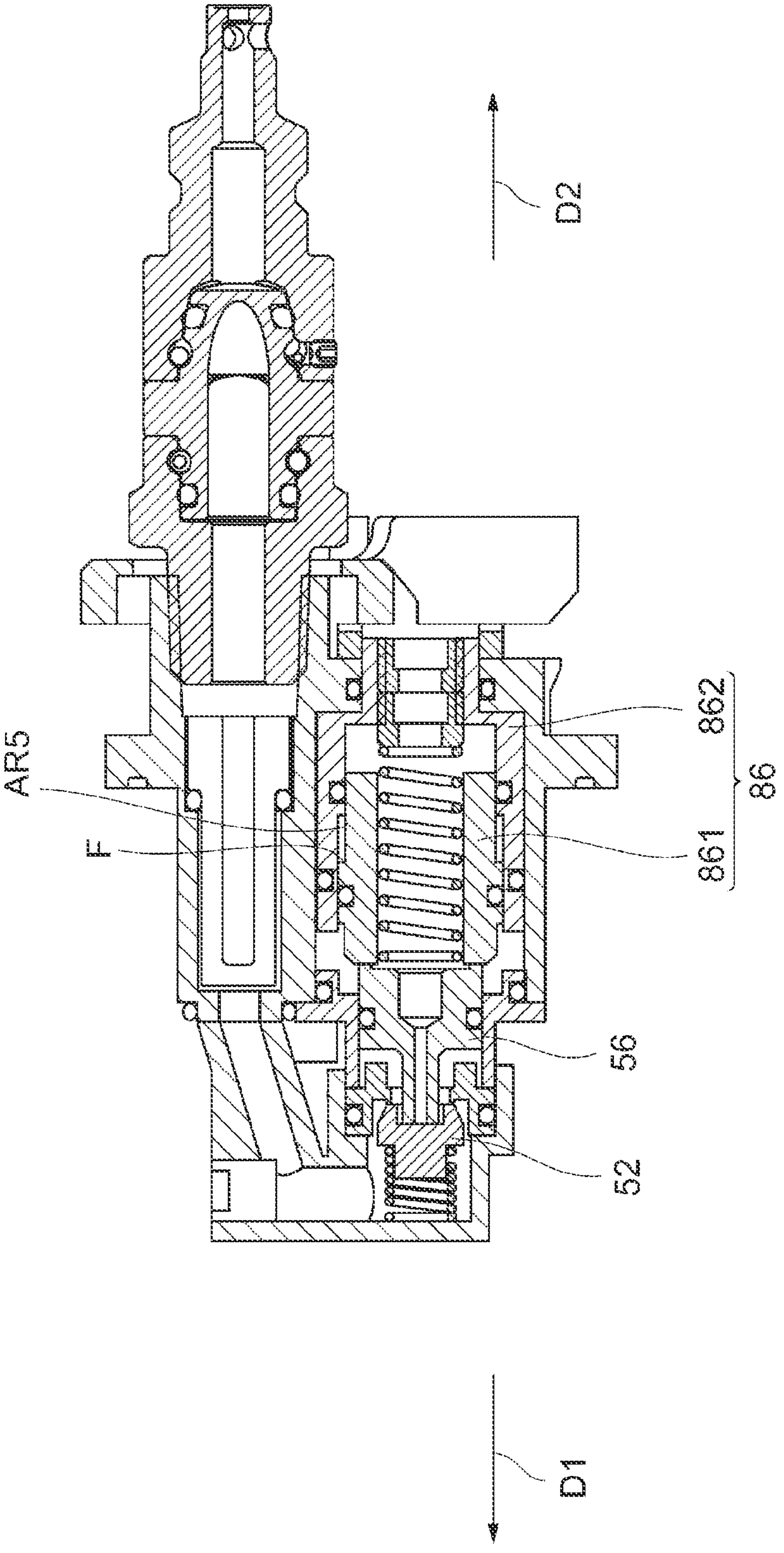
FIG. 12 is a sectional view showing a second modification of the primary pressure balance mechanism shown in FIG. 10.

FIG. 12 is a sectional view showing a second modification of the primary pressure balance mechanism shown in FIG. 10. The second modification is different from the present embodiment in that the pressure receiving surface F that receives a primary pressure common to the valve body 52 and is pressed in the direction opposite to the valve body 52 is formed not on the piston 56 but on the inner cylindrical portion 861 of the load release piston 86 divided into the inner cylindrical portion 861 and the outer cylindrical portion 862.

The inner cylindrical portion 861 is configured to be able to come into contact with the piston 56 which is a pressure receiving member. The primary pressure balance region AR5 is defined in a gap between the inner cylindrical portion 861 and the outer cylindrical portion 862, which have a spigot structure. The compressed fluid on the primary side is introduced into the primary pressure balance region AR5 through a bypass flow path (not shown). Even in the primary pressure balance mechanism of this modification, similarly to the primary pressure balance mechanism of the present embodiment, the primary pressure is applied to the piston 56 to constantly apply a load in the first direction D1 to the piston 56, and thus, the influence of the primary pressure on the secondary pressure can be reduced.

With the configuration as described above, the secondary pressure of the compressed air supplied to the drive mechanism 20 can be changed to adjust the pressure. Further, it is also possible to reduce the operating load at the time of adjusting the pressure. Meanwhile, when the dial 80 is further rotated so that the next convex portion and the next concave portion face each other, the load release piston 86 may be further displaced in the first direction D1 by the slope provided on the spacer 72. With this configuration, the secondary pressure can be adjusted in multiple stages. As described above, according to the present disclosure, it is possible to provide the pneumatic tool capable of reducing the operating load of the pressure adjusting mechanism.

Further, according to the present embodiment, the variation in load characteristic of the main spring 54 can be easily adjusted. Since each spring has a characteristic that a variation in load characteristic is large, after assembling a regulator, the variation in load characteristic of the regulator is eliminated by inserting a washer or by adjusting a screw for adjusting the initial load. In the present embodiment, the main spring 54, which is an elastic body, is arranged outside the valve body 52, that is, at a position close to the air intake. Therefore, the position of the end of the main spring 54 in the second direction D2 can be easily adjusted by removing the dial 80 and changing the position of the adjustment screw 66. As a result, the variation in load characteristic of the main spring 54 can be easily adjusted.

Further, in the present embodiment, in the first direction D1, the region where the main spring 54 is provided (region from the end of the main spring 54 in the first direction D1 to the end of the main spring 54 in the second direction D2) and the region where the first flow path CH1 is provided are at least partially overlapped. In this way, the full length W (see FIG. 3A) of the regulator 50 in the first direction D1 can be made smaller than that of the regulator in the related art, so that the amount of protrusion of the plug 62 can be suppressed and the full length of the nailing tool 10 can be shortened. Moreover, in the present embodiment, since there is a margin in the region on the second axis AX2, the large air filter 60 can be provided on the second axis AX2 (to be coaxial with the second axis AX2), as shown in FIG. 3A. It is possible to reduce the possibility that the regulator 50 cannot operate normally.

Meanwhile, the present disclosure can be applied to general pneumatic tools, for example, to air nailers, air drivers and pneumatic screwdrivers. The present disclosure may be applied to compressed fluid other than compressed air. Further, the present disclosure can be modified in various ways as long as it does not deviate from the gist thereof. For example, within the normal creative abilities of those skilled in the art, some components in the embodiments can be replaced with other known components that exhibit similar functions.

In addition, the present disclosure is a pneumatic tool including a drive mechanism configured to be driven by compressed air supplied from an air intake. The pneumatic tool includes an air chamber configured to store the compressed air supplied, and a pressure adjusting mechanism configured to adjust the pressure of the compressed air in the air chamber. The pressure adjusting mechanism includes a valve body configured to open and close a flow path that communicates the air intake and the air chamber with each other, an elastic body configured to exert an urging force to the valve body to open the flow path, and a pressure receiving member configured to receive air pressure in the air chamber and exert an urging force in a direction of closing the flow path to the elastic body. The elastic body is arranged at a position closer to the air intake than the valve body.

In the above aspect, the valve body and the elastic body may be arranged on a first axis, and at least a part of a flow path from the air intake to the pressure adjusting mechanism may extend along a second axis substantially parallel to the first axis.

In the above aspect, a flow path from the air intake to the pressure adjusting mechanism may have a portion extending in a first direction, and at least a part thereof may overlap, in the first direction, with a region where the elastic body is provided.

In the above aspect, the pressure receiving member may be a piston component that is arranged between the valve body and the elastic body and presses the valve body by the elastic body.

In the above aspect, the pneumatic tool may further include an adjustment unit configured to adjust an urging force exerted by the elastic body.

In the above aspect, the pneumatic tool may be applied to a driving tool for striking out a fastener. Further, the elastic body may be configured to exert an urging force in a first direction to the valve body, the pressure receiving member may be configured to exert an urging force in a second direction opposite to the first direction to the valve body, and a flow path from the air intake to the pressure adjusting mechanism may have a flow path for advancing compressed air in the first direction. Meanwhile, the present disclosure may be applied to compressed fluid other than compressed air.

Further, the present disclosure provides a pneumatic tool that includes a drive mechanism driven by compressed fluid and a valve mechanism for supplying the compressed fluid to the drive mechanism. In a direction of advancing in a first direction from the outside to the inside of the pneumatic tool, a plug, an elastic body, a piston component pressed by the elastic body, and a valve body pressed by the piston component are arranged in this order. Further, a flow path is formed that communicates a valve chamber in which the valve body is arranged and a flow path in the plug.

Further, the present disclosure is a pressure regulator for adjusting the pressure of compressed air. The pressure regulator includes a valve body configured to open and close a flow path that communicates an air intake for supplying compressed air and an air outlet for taking out the pressure-adjusted compressed air, an elastic body configured to exert an urging force to the valve body in a direction of opening the flow path, and a pressure receiving member configured to receive air pressure on the downstream side of the valve body and press the elastic body in a direction in which the valve body closes the flow path. The pressure regulator includes a pressure adjusting mechanism configured to adjust the pressure of compressed air acting on the valve body. The pressure adjusting mechanism includes a valve body configured to open and close a flow path that communicates the air intake and the air chamber with each other, an elastic body configured to exert an urging force to the valve body in a direction of opening the flow path, and a pressure receiving member configured to receive air pressure in the air chamber and press the elastic body in a direction of closing the flow path. The pressure receiving member is provided with a second pressure receiving surface that receives air pressure in the air chamber and is pressed in a direction of closing the flow path. The pressure receiving member or the member in contact with the pressure receiving member is provided with a third pressure receiving surface that is formed smaller than the second pressure receiving surface, receives air pressure on the upstream side of the valve body and is pressed in a direction of opening the flow path.

[Additional Notes]

This application discloses at least the following inventions (1) to (17).

(1) A pneumatic tool includes: a drive mechanism configured to be driven by compressed air supplied from an air intake; an air chamber configured to store the compressed air supplied; and a pressure adjusting mechanism configured to adjust a pressure of the compressed air in the air chamber. The pressure adjusting mechanism includes a valve body configured to open and close a flow path that communicates the air intake and the air chamber with each other; an elastic body configured to exert an urging force to the valve body in a direction of opening the flow path; a support part configured to support an end of the elastic body; a pressure receiving member configured to receive air pressure in the air chamber and press the elastic body in a direction of closing the flow path; and a load reducing mechanism capable of switching the urging force of the elastic body acting on the valve body between a normal state and a load reduction state in which the urging force smaller than the normal state is exerted.

(2) The pneumatic tool according to (1), the support part moves when the normal state is switched to the load reduction state.

(3) The pneumatic tool according to (1) or (2), further includes an operation input part by which a user can operate the urging force of the elastic body. The normal state is switched to the load reduction state in conjunction with an operation input to the operation input part.

(4) The pneumatic tool according to any one of (1) to (3), the pressure receiving member is a piston component that is arranged between the valve body and the elastic body and presses the valve body by the elastic body.

(5) The pneumatic tool according to (4), further includes an inner cylindrical portion formed in a cylindrical shape. The support part is an outer cylindrical portion that is externally fitted to the inner cylindrical portion and is slidable along the inner cylindrical portion. The elastic body penetrates the inner cylindrical portion and faces the piston component.

(6) The pneumatic tool according to any one of (1) to (5), the valve body and the elastic body are arranged on a first axis. At least a part of a flow path from the air intake to the pressure adjusting mechanism extends along a second axis substantially parallel to the first axis. The elastic body is arranged at a position closer to the air intake than the valve body.

(7) The pneumatic tool according to any one of (1) to (6), further includes: a load release region that is a closed space facing the support part and defined on the side opposite to the valve body with the support part interposed therebetween; a pressurized flow path that can introduce compressed air on the upstream side of the valve body into the load release region; a depressurized flow path that can discharge the compressed air introduced into the load release region to the outside of the pressure adjusting mechanism; and a load release valve configured to open and close the depressurized flow path.

In the above aspect, the load release valve may be opened in response to the operation of the operation input part, and the support part may move to the side opposite to the side where the valve body is located when the load release region is depressurized.

(8) The pneumatic tool according to (7), further includes an operation input part by which a user can operate the urging force of the elastic body. The load release valve is opened in response to an operation of the operation input part. The support part moves to the side opposite to the side where the valve body is located when the load release region is depressurized.

(9) The pneumatic tool according to any one of (1) to (6), the pneumatic tool is a driving tool for striking out a fastener.

(10) A pressure regulator for adjusting the pressure of compressed air, the pressure regulator includes: a valve body configured to open and close a flow path that communicates an air intake for supplying compressed air and an air outlet for taking out the pressure-adjusted compressed air, an elastic body configured to exert an urging force to the valve body in a direction of opening the flow path, and a pressure receiving member configured to receive air pressure on the downstream side of the valve body and press the elastic body in a direction in which the valve body closes the flow path. The pressure regulator further comprises a load reducing mechanism capable of switching the urging force of the elastic body acting on the valve body between a normal state and a load reduction state in which the urging force smaller than the normal state is exerted.

(11) A pneumatic tool includes, a drive mechanism configured to be driven by compressed air supplied from an air intake; an air chamber configured to store the compressed air supplied; and a pressure adjusting mechanism configured to adjust the pressure of the compressed air in the air chamber. The pressure adjusting mechanism includes a valve body configured to open and close a flow path that communicates the air intake and the air chamber with each other; an elastic body configured to exert an urging force to the valve body in a direction of opening the flow path; and a pressure receiving member configured to receive air pressure in the air chamber and press the elastic body in a direction of closing the flow path. The pressure receiving member is provided with a second pressure receiving surface that receives air pressure in the air chamber and is pressed in a direction of closing the flow path. The pressure receiving member or the member in contact with the pressure receiving member is provided with a third pressure receiving surface that is formed smaller than the second pressure receiving surface, receives air pressure on an upstream side of the valve body and is pressed in a direction of opening the flow path.

(12) The pneumatic tool according to (1), the valve body and the elastic body are arranged on a first axis. At least a part of a flow path from the air intake to the pressure adjusting mechanism extends along a second axis substantially parallel to the first axis.

(13) The pneumatic tool according to (2), a bypass flow path for applying air pressure on the upstream side of the valve body to the third pressure receiving surface is formed to straddle the second axis and the first axis.

(14) The pneumatic tool according to any one of (11) to (13), the pressure receiving member is a piston component that is arranged between the valve body and the elastic body and presses the valve body by the elastic body.

(15) The pneumatic tool according to any one of (1) to (4), further includes an inner cylindrical portion that can come into contact with the pressure receiving member and an outer cylindrical portion that is slidable along the inner cylindrical portion. The third pressure receiving surface is provided between the outer cylindrical portion and the inner cylindrical portion.

(16) The pneumatic tool according to any one of (11) to (15), a flow path from the air intake to the pressure adjusting mechanism has a portion extending in a first direction, and at least a part thereof overlaps, in the first direction, with a region where the elastic body is provided.

(17) The pneumatic tool according to any one of (11) to (16), the pneumatic tool is a driving tool for striking out a fastener.

The invention claimed is:

1. A pneumatic tool comprising:
- a drive mechanism configured to be driven by compressed air supplied from an air intake;
- an air chamber configured to store the compressed air supplied; and
- a pressure adjusting mechanism configured to adjust a pressure of the compressed air in the air chamber,
- wherein the pressure adjusting mechanism comprises:
  - a valve body configured to open and close a first flow path that communicates the air intake and the air chamber with each other;
  - an elastic body configured to exert an urging force to the valve body in a direction of opening the first flow path, the elastic body having a first end and a second end;
  - a support part configured to movably support the first end of the elastic body;
  - a pressure receiving member comprising a piston component configured to receive air pressure in the air chamber and to contact and move the second end of the elastic body in a direction of closing the first flow path; and
  - a load reducing mechanism capable of switching the urging force of the elastic body acting on the valve body between a normal state and a load reduction state in which the urging force smaller than the normal state is exerted.

2. The pneumatic tool according to claim 1, wherein the support part moves when the normal state is switched to the load reduction state.

3. The pneumatic tool according to claim 1, further comprising an operation input part by which a user can operate the urging force of the elastic body,
- wherein the normal state is switched to the load reduction state in conjunction with an input to the operation input part.

4. The pneumatic tool according to claim 1, wherein the piston component is arranged between the valve body and the elastic body and presses the valve body by the elastic body.

5. The pneumatic tool according to claim 4, further comprising an inner cylindrical portion formed in a cylindrical shape,
- wherein the support part is an outer cylindrical portion that is externally fitted to the inner cylindrical portion and is slidable along the inner cylindrical portion, and
- wherein the elastic body penetrates the inner cylindrical portion and faces the piston component.

6. The pneumatic tool according to claim 1, wherein the valve body and the elastic body are arranged on a first axis,
- wherein at least a part of a second flow path from the air intake to the pressure adjusting mechanism extends along a second axis substantially parallel to the first axis, and
- wherein the elastic body is arranged at a position closer to the air intake than the valve body.

7. The pneumatic tool according to claim 1, further comprising:
- a load release region that is a closed space facing the support part and defined on the side opposite to the valve body with the support part interposed therebetween;
- a pressurized flow path that can introduce compressed air on the upstream side of the valve body into the load release region;
- a depressurized flow path that can discharge the compressed air introduced into the load release region to the outside of the pressure adjusting mechanism; and
- a load release valve configured to open and close the depressurized flow path.

8. The pneumatic tool according to claim 7, further comprising an operation input part by which a user can operate the urging force of the elastic body, wherein the load release valve is opened in response to an operation of the operation input part, and wherein the support part moves to the side opposite to the side where the valve body is located when the load release region is depressurized.

9. The pneumatic tool according to claim 1, wherein the pneumatic tool is a faster driving tool.

10. A pressure regulator for adjusting the pressure of compressed air, the pressure regulator comprising:

a valve body configured to open and close a flow path that communicates an air intake for supplying compressed air and an air outlet for taking out the pressure-adjusted compressed air, an elastic body configured to exert an urging force to the valve body in a direction of opening the flow path, the elastic body having a first end and a second end, a support part configured to movably support the first end of the elastic body, and a pressure receiving member comprising a piston component configured to receive air pressure on the downstream side of the valve body and to contact and move the second end of the elastic body in a direction in which the valve body closes the flow path, wherein the pressure regulator further comprises a load reducing mechanism capable of switching the urging force of the elastic body acting on the valve body between a normal state and a load reduction state in which the urging force smaller than the normal state is exerted.

* * * * *